United States Patent
Oh et al.

(10) Patent No.: US 10,292,195 B2
(45) Date of Patent: May 14, 2019

(54) TERMINAL AND METHOD FOR CONTROLLING COOPERATIVE TRANSMISSION IN COMMUNICATION SYSTEM

(75) Inventors: Seong-Keun Oh, Gyeonggi-do (KR); Min Lee, Gyeonggi-do (KR)

(73) Assignee: AJOU UNIVERSITY INDUSTRY-ACADEMIC COOPERATION FOUNDATION, Suwon-si (KR)

(*) Notice: Subject to any disclaimer, the term of this patent is extended or adjusted under 35 U.S.C. 154(b) by 1002 days.

(21) Appl. No.: 14/236,715

(22) PCT Filed: Jul. 12, 2012

(86) PCT No.: PCT/KR2012/005538
§ 371 (c)(1),
(2), (4) Date: May 27, 2014

(87) PCT Pub. No.: WO2013/018999
PCT Pub. Date: Feb. 7, 2013

(65) Prior Publication Data
US 2014/0293874 A1    Oct. 2, 2014

(30) Foreign Application Priority Data
Aug. 3, 2011 (KR) .................. 10-2011-0077423

(51) Int. Cl.
*H04B 7/06* (2006.01)
*H04B 7/024* (2017.01)
*H04W 76/15* (2018.01)

(52) U.S. Cl.
CPC ............ *H04W 76/15* (2018.02); *H04B 7/024* (2013.01); *H04B 7/0626* (2013.01); *H04B 7/0689* (2013.01)

(58) Field of Classification Search
CPC ........... H04W 76/025; H04W 72/0413; H04W 88/02; H04B 7/024; H04B 7/0626;
(Continued)

(56) References Cited

U.S. PATENT DOCUMENTS 8,396,153 B1 * 3/2013 Shen ............... H04B 7/024
370/464
2011/0281585 A1 11/2011 Kwon et al.
(Continued)

FOREIGN PATENT DOCUMENTS

CN      101047423 A    10/2007
KR      20090101760 A   9/2009
(Continued)

OTHER PUBLICATIONS

PCT/ISA/237 Written Opinion issued on PCT/KR2012/005538 (pp. 5).
PCT/ISA/210 Search Report issued on PCT/KR2012/005538 (pp. 3).

*Primary Examiner* — Ian N Moore
*Assistant Examiner* — Brian T Le
(74) *Attorney, Agent, or Firm* — Stein IP, LLC

(57) ABSTRACT

The present invention pertains to a communication system, and more particularly, to a terminal and method for autonomously controlling cooperative transmission wherein the terminal determines a cooperative transmission mode based on channel information and service quality information acquired by the terminal in a communication system. To this end, the present invention provides a terminal for controlling cooperative transmission from/to at least two cooperative transmission communication devices, the terminal including: a transmission mode determination unit for determining a cooperative transmission mode; and a mode-transmission-targeting communication device set determination unit for determining at least one mode-transmission-targeting communication device to which information on the determined cooperative transmission mode is to be transmitted.

13 Claims, 23 Drawing Sheets

(58) Field of Classification Search
CPC .. H04B 7/0689; H04B 7/0452; H04B 7/0413; H04L 5/0035
See application file for complete search history.

(56) References Cited

U.S. PATENT DOCUMENTS

2012/0087273 A1  4/2012  Koo et al. .................... 370/252
2012/0188904 A1  7/2012  Kao et al.

FOREIGN PATENT DOCUMENTS

| | | |
|---|---|---|
| KR | 2010-0094151 A | 8/2010 |
| KR | 2010-0131341 A | 12/2010 |
| KR | 1020110008703 | 1/2011 |
| KR | 1020110035807 | 4/2011 |
| KR | 1020110051114 | 5/2011 |
| WO | WO 2010087618 | 8/2010 |
| WO | WO 2010140872 | 12/2010 |

* cited by examiner

TERMINAL AND METHOD FOR CONTROLLING COOPERATIVE TRANSMISSION IN COMMUNICATION SYSTEM

PRIORITY

This application is a National Stage application under 35 U.S.C. § 371 of International Application No. PCT/KR2012/005538 filed Jul. 12, 2012, which claims priority under 35 U.S.C. § 365(b) to Korean Patent Application No. 10-2011-0077423 filed Aug. 3, 2011, the disclosure of each of which is incorporated herein by reference.

TECHNICAL FIELD

The present invention relates to a communication system, and more specifically relates to a terminal for leadingly controlling cooperative transmission by a cooperative transmission mode based on channel information and service quality information acquired in the terminal and a cooperative transmission control method thereof in a communication system.

BACKGROUND ART

In a mobile communication system, a study for providing terminals with high-speed services having various required Quality of Services (QoSs) has been actively developed. Here, the mobile communication system may be a Long Term Evolution (LTE) mobile communication system, a mobile communication system using a 3rd Generation Partnership Project 2 (3GPP2) standard based on a Code Division Multiple Access (CDMA) scheme (hereinafter, called as 3GPP2 mobile communication system), a mobile communication system using a 3rd Generation Partnership Project (3GPP) standard based on a Wideband Code Division Multiple Access (WCDMA) scheme (hereinafter, called as '3GPP mobile communication system'), a WiMAX mobile communication system using a Worldwide Interoperability for Microwave Access (WiMAX) Forum Network Working Group standard, an Institute of Electrical and Electronics Engineers (IEEE) 802.16m mobile communication system, and the like.

DISCLOSURE

Technical Problem

In such mobile communication system, a coordinator which induces an access of a base station or a mobile terminal should acquire channel information from the mobile terminal in order to determine a cooperative transmission mode in a network-centric communication system where the cooperative transmission mode is determined. The channel information is quantized in the terminal and the quantized channel information is transmitted. The base station may be a communication device which provides a radio access to terminals which are located within an area of a related cell such as a base station, a femto cell base station, and an access point. The coordinator may be a mobile terminal or a device which relay a data transmission/reception between a mobile terminal and a base station such as a relay, and a repeater. As described above, in a network-centric communication system, it is difficult to accurately consider a channel characteristic since quantized channel information should be acquired from a terminal. Further, a cooperative transmission communication device or a coordinator should collect channel information among a plurality of cooperative transmission communication devices except for the cooperative transmission communication device or the coordinator and a terminal as a reference communication device, so a delay may occur and a problem that a signaling overhead among networks increases may occur.

Technical Solution

In order to solve the above-mentioned problems, the present invention provides a terminal as a target of cooperative transmission in a communication system for leadingly controlling cooperative transmission by determining a cooperative transmission mode based on channel information and service quality information which the terminal acquires and a cooperative transmission control method thereof.

In accordance with an aspect of the present invention, a terminal for controlling cooperative transmission front/to at least two cooperative transmission communication devices is provided. The terminal includes a transmission mode determination unit configured to determine a cooperative transmission mode; and a mode-transmission-targeting communication device set determination unit configured to determine at least one mode-transmission-targeting communication device to which information on the determined cooperative transmission mode will be transmitted.

In accordance with another aspect of the present invention, a cooperative transmission control device of a terminal is provided. The terminal includes a transmission mode determination unit configured to change a cooperative transmission mode; and a communication device set determination unit configured to determine at least one mode-transmission-targeting communication device to which information on the changed cooperative transmission mode will be transmitted.

In accordance with another aspect of the present invention, a method for controlling cooperative transmission from/to at least two cooperative transmission communication devices in a terminal is provided. The method includes a cooperative transmission mode determining step of determining a cooperative transmission mode; and a mode-transmission-targeting communication device determining step of determining at least one mode-transmission-targeting communication device to which information on the determined cooperative transmission mode will be transmitted.

In accordance with another aspect of the present invention, a method for controlling cooperative transmission in a terminal is provided. The method includes changing a cooperative transmission mode; and determining at least one mode-transmission-targeting communication device which information on the changed cooperative transmission mode will be transmitted.

Advantageous Effects

As is apparent from the foregoing description, the present invention enables to determine an optimal cooperative transmission mode which is appropriate for a required service and a channel characteristic and markedly reduce a delay and a signaling among networks by providing a cooperative transmission control method of a terminal for leadingly controlling cooperative transmission by determining a cooperative transmission mode based on channel information and service quality information which the terminal acquires in a communication system.

A terminal according to the present invention enables to perform various forms of cooperative transmission from/to at least two cooperative transmission communication devices using various cooperative transmission modes including a same information transmission mode, a different information transmission mode, a hybrid information transmission mode, and a partial set cooperative transmission mode. In the same information transmission mode, eight forms of cooperative transmission are possible according to a combination of a session, a resource, and a transmission scheme. In the different information transmission mode, eight forms of cooperative transmission are also possible according to a combination of a session, a resource, and a transmission scheme. Various forms of cooperative transmission are possible by cooperatively transmitting partially same information and partially different information included in the hybrid information transmission mode using the same information transmission mode and the different information transmission mode, respectively. In the partial set cooperative transmission mode, various forms of cooperative transmission from/to a part of cooperative transmission communication devices included in the cooperative transmission communication device set are possible using one of the same information transmission mode, the different information transmission mode, and the hybrid information transmission mode.

A terminal according to the present invention enables to provide cooperative transmission mode information to a mode-transmission-targeting communication device using various methods by determining a communication device to which the terminal will transmit cooperative transmission mode information which the terminal determines autonomously thereby a network controls various forms of cooperative transmission. The terminal enables to provide the cooperative transmission mode information which the terminal determines autonomously to a coordinator thereby a coordinator of a network controls various forms of cooperative transmission, or the terminal enables to provide the cooperative transmission mode information which the terminal determines autonomously to a part of cooperative transmission communication devices included in a cooperative transmission communication device set thereby the cooperative transmission communication device set controls cooperative transmission, or the terminal enables to provide the cooperative transmission mode information which the terminal determines autonomously to all of the cooperative transmission communication devices included in the cooperative transmission communication device set thereby directly controlling cooperative transmission.

A terminal according to the present invention enables a cooperative transmission mode in which a service satisfying a user's request may be provided by considering at least one of: a channel condition, a connection state, a RAT preference, a service price, an neighbor list order, a required bandwidth condition, a required transmission rate condition, a required error rate condition, an access condition, a distance between a cooperative transmission communication device and the terminal, and loading rate of the cooperative transmission communication device.

A terminal according to the present invention enables a cooperative transmission managing subject which is best in a current communication network situation by determining at least one communication device to which the determined cooperative transmission mode will be transmitted by considering at least one of: a channel condition, a connection state, a RAT preference, a service price, an neighbor list order, a required bandwidth condition, a required transmission rate condition, a required error rate condition, an access condition, a distance between a cooperative transmission communication device and the terminal, and loading rate of the cooperative transmission communication device.

A terminal according to the present invention enables to optimally determine a cooperative transmission communication device set including at least two cooperative transmission communication devices, antenna set for each cooperative transmission communication device, an antenna combining method of each of antenna sets for each cooperative transmission communication device for connecting to a cooperative transmission communication device set based on this, and a common use type of each of the antenna sets for each cooperative transmission communication device by considering at least one of: a channel condition, a connection state, a RAT preference, a service price, an neighbor list order, a required bandwidth condition, a required transmission rate condition, a required error rate condition, an access condition, a distance between a cooperative transmission communication device and the terminal, and loading rate of the cooperative transmission communication device.

A terminal according to the present invention enables cooperative transmission through multiple sessions or cooperative transmission through multiple RATs by autonomously determining an optimal cooperative transmission mode among a same information transmission mode, a different information transmission mode, a hybrid information transmission mode, and a partial set cooperative transmission mode.

If a unsatisfied service is currently provided, a terminal according to the present invention enables to continuously maintain an optimal cooperative transmission condition by changing a cooperative transmission mode based on a channel condition and a service required condition and determining at least one communication device to which information on the changed cooperative transmission mode will be transmitted. Here, the cooperative transmission mode may be optimally changed by additionally changing at least one of a cooperative transmission communication device set, antenna sets for each cooperative transmission communication device, an antenna combining method of each of the antenna sets for each cooperative transmission communication device, and a common use type of each of the antenna sets for each cooperative transmission communication device.

A terminal according to the present invention enables a high-quality communication and a ultra high-speed transmission by evading an interference which influences neighbor communication devices and an interference which is received from neighbor communication devices through cooperative transmission from/to neighbor communication devices.

BEST MODE

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

Figure 1:
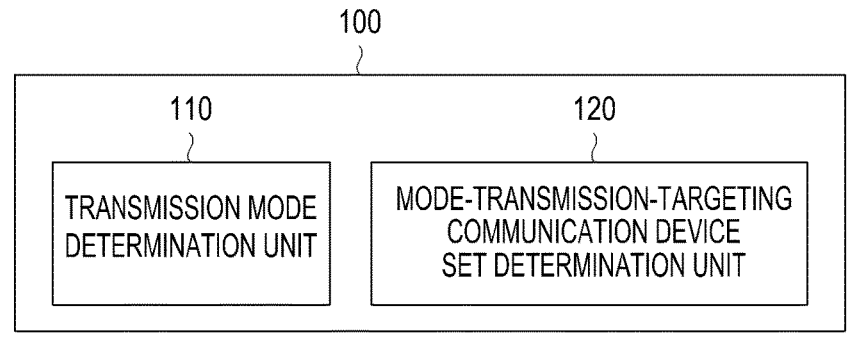
FIG. 1 illustrates a block diagram of a first terminal for controlling cooperative transmission according to an embodiment of the present invention.

FIG. 1 illustrates a block diagram of a first terminal for controlling cooperative transmission according to an embodiment of the present invention.

As illustrated in FIG. 1, a first terminal 100 controls cooperative transmission according to an embodiment of the present invention is a terminal for controlling cooperative transmission from/to at least two cooperative transmission communication devices, and includes a transmission mode determination unit 110 for determining a cooperative transmission mode and a mode-transmission-targeting communication device set determination unit 120 for determining at least one cooperative transmission communication device to which information on the determined cooperative transmission mode will be transmitted.

The transmission mode determination unit 110 determines a cooperative transmission mode where a terminal performs cooperative transmission from/to at least two cooperative transmission communication devices. Here, the terminal determines the cooperative transmission mode where the terminal performs cooperative transmission from/to the at least two cooperative transmission communication devices by considering at least one of: a channel condition, a connection state, a Radio Access Technology (RAT) preference, a service price, an neighbor list order, a required bandwidth condition, a required transmission rate condition, a required error rate condition, an access condition, a distance between a cooperative transmission communication device and the terminal, and loading rate of the cooperative transmission communication device. The cooperative transmission mode includes a same information transmission mode where same information is transmitted, a different information transmission mode where different information is transmitted, a hybrid information transmission mode where at least one stream of hybrid information is transmitted, and a partial set cooperative transmission mode where partial information is transmitted. Various transmission modes will be descried below.

The mode-transmission-targeting communication device set determination unit 120 determines at least one communication device to which the information on the cooperative transmission mode determined in the transmission mode determination unit 110 will be transmitted. Here, the terminal determines the at least one communication device to which the information on the determined cooperative transmission mode will be transmitted by considering the at least one of: the channel condition, the connection state, the RAT preference, the service price, the neighbor list order, the required bandwidth condition, the required transmission rate condition, the required error rate condition, the access condition, the distance between the cooperative transmission communication device and the terminal, and the loading rate of the cooperative transmission communication device.

The terminal determines a cooperative transmission mode and a cooperative transmission mode-transmission-targeting communication device set by interconnecting the transmission mode determination unit 110 and the mode-transmission-targeting communication device set determination unit 120.

That is, after determining the cooperative transmission mode through the transmission mode determination unit 110, the terminal may determine the cooperative transmission mode-transmission-targeting communication device set through the mode-transmission-targeting communication device set determination unit 120.

After determining the cooperative transmission mode-transmission-targeting communication device set through the mode-transmission-targeting communication device set determination unit 120, the terminal may determine the cooperative transmission mode through the transmission mode determination unit 110.

The terminal may jointly determine the cooperative transmission mode and the cooperative transmission mode-transmission-targeting communication device set through the transmission mode determination unit 110 and the mode-transmission-targeting communication device set determination unit 120.

Figure 2:
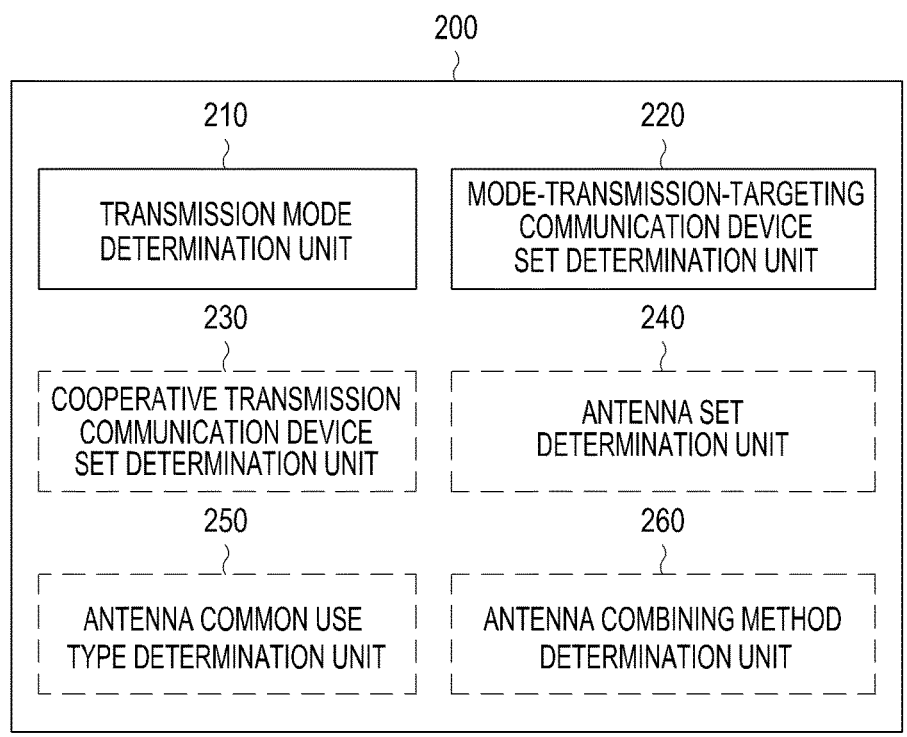
FIG. 2 illustrates a block diagram of a second terminal for controlling cooperative transmission according to an embodiment of the present invention.

FIG. 2 illustrates a block diagram of a second terminal for controlling cooperative transmission according to an embodiment of the present invention.

As illustrated in FIG. 2, a second terminal 200 for controlling cooperative transmission according to an embodiment of the present invention is a terminal which controls cooperative transmission from/to at least two cooperative transmission communication devices, and includes a transmission mode determination unit 210 for determining a cooperative transmission mode, a mode-transmission-targeting communication device set determination unit 220, a cooperative transmission communication device set determination unit 230, an antenna set determination unit 240, an antenna common use type determination unit 250, and an antenna combining method determination unit 260.

The second terminal for controlling the cooperative transmission according to an embodiment of the present invention further includes a transmission mode determination unit and a mode-transmission-targeting communication device set determination unit of the first terminal, the cooperative transmission communication device set determination unit 230 for determining at least two cooperative transmission communication devices, the antenna set determination unit 240 for determining an antenna set for each cooperative transmission communication device, the antenna common use type determination unit 250 for determining a common use type of antenna sets for each cooperative transmission communication device, and the antenna combining method determination unit 260 for determining an antenna combining method of each of antenna sets for each cooperative transmission communication device.

Hereinafter, a detailed description of the second terminal for controlling the cooperative transmission according to an embodiment of the present invention will be followed.

The transmission mode determination unit 210 determines a cooperative transmission mode where the terminal performs cooperative transmission from/to at least two cooperative transmission communication devices. Here, the terminal determines the cooperative transmission mode where the terminal performs cooperative transmission from/to the at least two cooperative transmission communication devices by considering at least one of: a channel condition, a connection state, a RAT preference, a service price, an neighbor list order, a required bandwidth condition, a required transmission rate condition, a required error rate condition, an access condition, a distance between a cooperative transmission communication device and the terminal, and loading rate of the cooperative transmission communication device. The cooperative transmission mode includes a same information transmission mode where same information is transmitted, a different information transmission mode where different information is transmitted, a hybrid information transmission mode where at least one stream of hybrid information is transmitted, and a partial set cooperative transmission mode where partial information is transmitted. Various transmission modes will be described below.

The mode-transmission-targeting communication device set determination unit 220 determines at least one communication device to which information on the cooperative transmission mode determined in the transmission mode determination unit 110 will be transmitted. Here, the terminal determines the at least one communication device to which the information on the determined cooperative transmission mode will be transmitted by considering the at least one of: the channel condition, the connection state, the RAT preference, the service price, the neighbor list order, the required bandwidth condition, the required transmission rate condition, the required error rate condition, the access condition, the distance between the cooperative transmission communication device and the terminal, and the loading rate of the cooperative transmission communication device.

The cooperative transmission communication device set determination unit 230 determines at least two cooperative transmission communication devices for cooperative transmission. Here, the terminal determines the at least two cooperative transmission communication devices for the cooperative transmission by considering the at least one of: the channel condition, the connection state, the RAT preference, the service price, the neighbor list order, the required bandwidth condition, the required transmission rate condition, the required error rate condition, the access condition, the distance between the cooperative transmission communication device and the terminal, and the loading rate of the cooperative transmission communication device. The cooperative transmission communication device includes a base station, a relay, a repeater, a femto cell base station, a relay transmission femto cell base station, a terminal, a relay transmission terminal, and the like, and the at least two cooperative transmission communication devices may consist of RATs which are different one another. The terminal includes a base station, a relay, a repeater, a femto cell base station, a relay transmission femto cell base station, a relay transmission terminal, and the like.

The antenna set determination unit 240 determines at least one antenna for connecting to each of cooperative transmission communication devices among antennas equipped in the terminal. The terminal determines the at least one antenna for connecting to each of the cooperative transmission communication devices by considering the at least one of: the channel condition, the connection state, the RAT preference, the service price, the neighbor list order, the required bandwidth condition, the required transmission rate condition, the required error rate condition, the access condition, the distance between the cooperative transmission communication device and the terminal, and the loading rate of the cooperative transmission communication device.

The antenna common use type determination unit 250 determines a common use type of antenna sets for each cooperative transmission communication device, and determines that each of the cooperative transmission communication devices which perform cooperative transmission to/from the terminal uses commonly or uses exclusively a part or all of antennas forming each antenna set for each cooperative transmission communication device. The terminal determines the common use type of the antenna sets for each cooperative transmission communication device by considering the at least one of the channel condition, the connection state, the RAT preference, the service price, the neighbor list order, the required bandwidth condition, the required transmission rate condition, the required error rate condition, the access condition, the distance between the cooperative transmission communication device and the terminal, and the loading rate of the cooperative transmission communication device.

The antenna combining method determination unit 260 determines an antenna combining method for each of the antenna sets for each cooperative transmission communication device, and determines a method for combining at least two antennas forming an antenna set for each cooperative transmission communication device. Each antenna set is determined as one of an omnidirectional combining, a directional combining, a diversity combining, a multiplexing combining, a diversity-multiplexing hybrid combining, a Cyclic Delay Diversity (CDD) combining, and a multi-user combining by determining at least one of a directional beam pattern and a signal transmission/reception method for each antenna set. Here, the terminal determines the antenna combining method for each of the antenna sets for each cooperative transmission communication device by considering the at least one of the channel condition, the connection state, the RAT preference, the service price, the neighbor list order, the required bandwidth condition, the required transmission rate condition, the required error rate condition, the access condition, the distance between the cooperative transmission communication device and the terminal, and the loading rate of the cooperative transmission communication device.

The transmission mode determination unit 210, the mode-transmission-targeting communication device set determination unit 220, the cooperative transmission communication device set determination unit 230, the antenna set determination unit 240, the antenna common use type determination unit 250, and the antenna combining method determination unit 260 determines the cooperative transmission mode, or determines a cooperative transmission mode-transmission-targeting communication device set, or determines a cooperative transmission communication device set, or determines an antenna set for each cooperative transmission communication device, or determines a common use type of antenna sets for each cooperative transmission communication device, or determines an antenna combining method of each of antenna sets for each cooperative transmission communication device by considering a channel condition, a service condition, a user condition, an access condition, and the like, respectively.

The terminal determines the cooperative transmission mode, determines the cooperative transmission communication device set, determines the antenna set for each cooperative transmission communication device, or determines the common use type of the antenna sets for each cooperative transmission communication device, and determines the antenna combining method of each of the antenna sets for each cooperative transmission communication device by interconnecting each of the transmission mode determination unit 210, the mode-transmission-targeting communication device set determination unit 220, the cooperative transmission communication device set determination unit 230, the antenna set determination unit 240, the antenna common use type determination unit 250, and the antenna combining method determination unit 260.

Hereinafter, various embodiments for a interconnection will be described with reference to the transmission mode determination unit 210, the mode-transmission-targeting communication device set determination unit 220, the cooperative transmission communication device set determination unit 230, the antenna set determination unit 240, the antenna common use type determination unit 250, and the antenna combining method determination unit 260 in a second cooperative transmission control device 200 of a terminal.

1. embodiment #1: The terminal may jointly determine a cooperative transmission mode through the transmission mode determination unit 210, a cooperative transmission mode-transmission-targeting communication device set through the mode-transmission-targeting communication device set determination unit 220, and a cooperative transmission communication device set through the cooperative transmission communication device set determination unit 230.

2. embodiment #2: After jointly determining the cooperative transmission mode through the transmission mode determination unit 210, and the cooperative transmission mode-transmission-targeting communication device set through the mode-transmission-targeting communication device set determination unit 220, the terminal may jointly determine a cooperative transmission communication device set according to the determined cooperative transmission mode and cooperative transmission mode-transmission-targeting communication device set.

3. embodiment #3: The terminal may jointly determine the cooperative transmission mode through the transmission mode determination unit 210, the cooperative transmission mode-transmission-targeting communication device set through the mode-transmission-targeting communication device set determination unit 220, and the antenna set for each cooperative transmission communication device through the antenna set determination unit 240.

4. embodiment #4: After jointly determining the cooperative transmission mode through the transmission mode determination unit 210 and the antenna set for each cooperative transmission communication device through the antenna set determination unit 240, the terminal may jointly determine the cooperative transmission mode-transmission-targeting communication device set according to the determined cooperative transmission mode and antenna set for each cooperative transmission communication device.

5. embodiment #5: The terminal may jointly determine the cooperative transmission mode through the transmission mode determination unit 210, the cooperative transmission mode-transmission-targeting communication device set through the mode-transmission-targeting communication device set determination unit 220, and the common use type of the antenna sets for each cooperative transmission communication device through the antenna common use type determination unit 250.

6. embodiment #6: After jointly determining the cooperative transmission mode-transmission-targeting communication device set through the mode-transmission-targeting communication device set determination unit 220 and the common use type of the antenna sets for each cooperative transmission communication device through the antenna common use type determination unit 250, the terminal may jointly determine the cooperative transmission mode according to the determined cooperative transmission mode-transmission-targeting communication device set and common use type of the antenna sets for each cooperative transmission communication device.

7. embodiment #7: The terminal may jointly determine the cooperative transmission mode through the transmission mode determination unit 210, the cooperative transmission mode-transmission-targeting communication device set through the mode-transmission-targeting communication device set determination unit 220, and the antenna combining method of each of the antenna sets for each cooperative transmission communication device through the antenna combining method determination unit 260.

8. embodiment #8: The terminal may jointly determine the cooperative transmission mode through the transmission mode determination unit 210, the cooperative transmission mode-transmission-targeting communication device set through the mode-transmission-targeting communication device set determination unit 220, the cooperative transmission communication device set through the cooperative transmission communication device set determination unit 230, and the antenna set for each cooperative transmission communication device through the antenna set determination unit 240.

9. embodiment #9: After jointly determining the cooperative transmission mode through the transmission mode determination unit 210 and the cooperative transmission communication device set through the cooperative transmission communication device set determination unit 230, the terminal may jointly determine the cooperative transmission mode-transmission-targeting communication device set through the mode-transmission-targeting communication device set determination unit 220 and the common use type of the antenna sets for each cooperative transmission communication device through the antenna common use type determination unit 250 according to the determined cooperative transmission mode and cooperative transmission communication device set.

10, embodiment #10: After jointly determining the cooperative transmission mode through the transmission mode determination unit 210 and the cooperative transmission mode-transmission-targeting communication device set through the mode-transmission-targeting communication device set determination unit 220, the terminal jointly determines the antenna set for each cooperative transmission communication device through the antenna set determination unit 240 according to the determined cooperative transmission mode and cooperative transmission mode-transmission-targeting communication device set. The terminal determines the antenna combining method of each of the antennas for each cooperative transmission communication device through the antenna combining method determination unit 260 by considering the determined cooperative transmission mode, cooperative transmission mode-transmission-targeting communication device set, and antenna set for each cooperative transmission communication device.

11. embodiment #11: After jointly determining the cooperative transmission mode through the transmission mode determination unit 210 and the cooperative transmission mode-transmission-targeting communication device set through the mode-transmission-targeting communication device set determination unit 220, the terminal jointly determines the cooperative transmission communication device set through the cooperative transmission communication device set determination unit 230 and the antenna set for each cooperative transmission communication device through the antenna set determination unit 240 according to the determined cooperative transmission mode and cooperative transmission mode-transmission-targeting communication device set. The terminal determines the common use type of the antenna sets for each cooperative transmission communication device through the antenna common use type determination unit 250 by considering the determined cooperative transmission mode, cooperative transmission mode-transmission-targeting communication device set, cooperative transmission communication device set, and antenna set for each cooperative transmission communication device.

12, embodiment #12: The terminal may jointly determine the cooperative transmission mode through the transmission mode determination unit 210, the cooperative transmission mode-transmission-targeting communication device set through the mode-transmission-targeting communication device set determination unit 220, the cooperative transmission communication device set through the cooperative transmission communication device set determination unit 230, the antenna set for each cooperative transmission communication device through the antenna set determination unit 240, the common use type of the antenna sets for each cooperative transmission communication device through the antenna common use type determination unit 250, and the antenna combining method of each of the antenna sets for each cooperative transmission communication device through the antenna combining method determination unit 260.

13. embodiment #13: The terminal determines the cooperative transmission mode through the transmission mode determination unit 210, determines the cooperative transmission mode-transmission-targeting communication device set through the mode-transmission-targeting communication device set determination unit 220 according to the determined cooperative transmission mode, determines the cooperative transmission communication device set through the cooperative transmission communication device set determination unit 230 according to the determined cooperative transmission mode and cooperative transmission mode-transmission-targeting communication device set, determines the antenna set for each cooperative transmission communication device through the antenna set determination unit 240 according to the determined cooperative transmission mode, cooperative transmission mode-transmission-targeting communication device set, and cooperative transmission communication device set, determines the common use type of the antenna sets for each cooperative transmission communication device through the antenna common use type determination unit 250 according to the determined cooperative transmission mode, cooperative transmission mode-transmission-targeting communication device set, cooperative transmission communication device set, and antenna set for each cooperative transmission communication device, and determines the antenna combining method of each of the antenna sets for each cooperative transmission communication device through the antenna combining method determination unit 260 according to the determined cooperative transmission mode, cooperative transmission mode-transmission-targeting communication device set, cooperative transmission communication device set, antenna set for each cooperative transmission communication device, and common use type of the antenna sets for each cooperative transmission communication device.

In the present invention, various embodiments as well as the embodiment #1 to the embodiment #13 are possible.

That is, in the present invention, the terminal may establish a connection for cooperative transmission from/to at least two cooperative transmission communication devices according to whether a related determining process is performed, an order of determining each cooperative determining target and each determined cooperatively element, and the like upon determining the cooperative transmission mode, the cooperative transmission mode-transmission-targeting communication device set, the cooperative transmission communication device set, the antenna set for each cooperative transmission communication device, the common use type of the antennas sets for each cooperative transmission communication device, and the antenna combining method of each of the antenna sets for each cooperative transmission communication device.

Hereinafter, each of the transmission mode determination unit 210, the mode-transmission-targeting communication device set determination unit 220, the cooperative transmission communication device set determination unit 230, the antenna set determination unit 240, the antenna common use type determination unit 250, and the antenna combining method determination unit 260 in FIG. 2 will be described.

1. Transmission Mode Determination Unit 210

When a terminal according to the present invention, performs cooperative transmission from/to the at least two cooperative transmission communication devices, the terminal determines a cooperative transmission mode for transmitting/receiving a signal to/from at least two cooperative transmission communication devices by considering consideration elements for determining the cooperative transmission mode. The cooperative transmission mode includes a same information transmission mode where same information is transmitted, a different information transmission mode where different information is transmitted, a hybrid information transmission mode where at least two streams of information are mixed and transmitted, and a partial set cooperative transmission mode where partial information is cooperatively transmitted. The consideration elements will be described below.

1-1. same information transmission mode: is a transmission mode where a terminal cooperatively transmits same information to at least two cooperative transmission communication devices or the at least two cooperative transmission communication devices cooperatively transmits same information to the terminal.

Hereinafter, FIGS. 3 to 6 illustrate various transmitting/receiving methods for transmitting/receiving same information between a terminal and at least two cooperative transmission communication devices. That is, the terminal may cooperatively transmit same information through a single session or multiple sessions and may transmit same information through the same resource or different resources.

Figure 3:
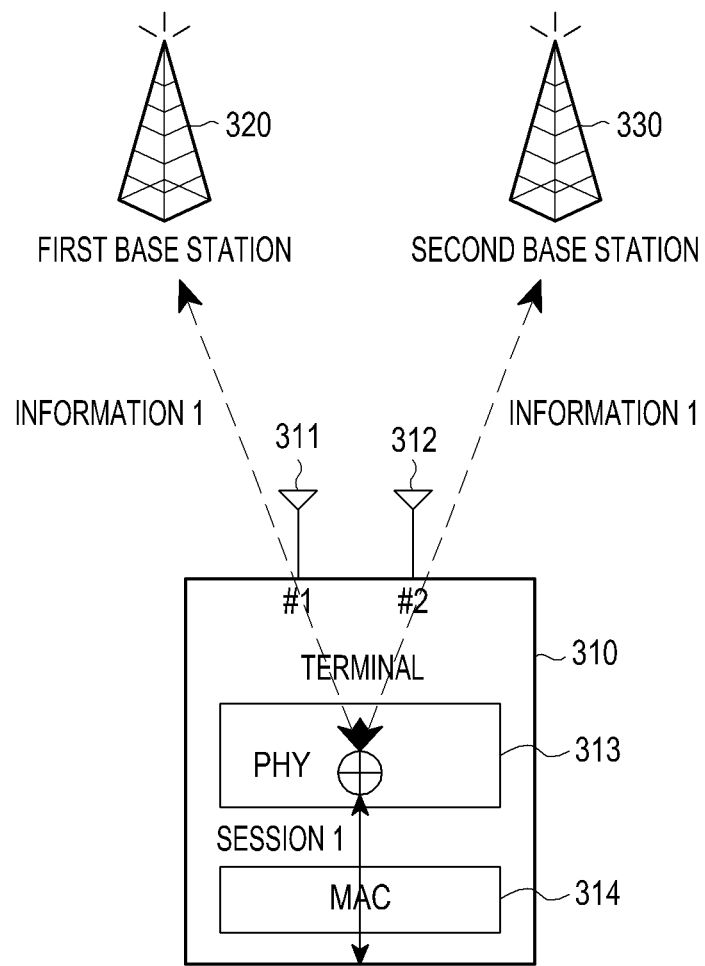
FIG. 3 illustrates an example of an operation of cooperatively transmitting same information through a single session according to an embodiment of the present invention.

FIG. 3 illustrates an example of an operation of cooperatively transmitting same information through a single session according to an embodiment of the present invention.

As illustrated in FIG. 3, a terminal 310 cooperatively transmits same information from/to a first base station 320 and a second base station 330 through a single session upon operating in a same information transmission mode. The terminal 310 equips with a first antenna 311 and a second antenna 312, and includes a PHY layer 313 and a MAC layer 314. First information is transmitted to the first base station 320 through the first antenna 311, and the first information is transmitted to the second base station 330 through the second antenna 312. The terminal 310 combines signals in a PRY layer by transmitting/receiving the first information to/from the first base station 320 and the second base station 330 through a diversity cooperative transmission such as an Alamouti coding, and cooperatively transmits same information of a single session. The Alamouti diversity transmitting/receiving method will be described with reference to FIG. 18. A signal transmitting method and an antenna using method of each of the first base station 320 and the second base station 330 may be various and be independent.

In this way, a terminal may cooperatively transmit same information of a single session from/to at least two cooperative transmission communication devices.

Figure 4:
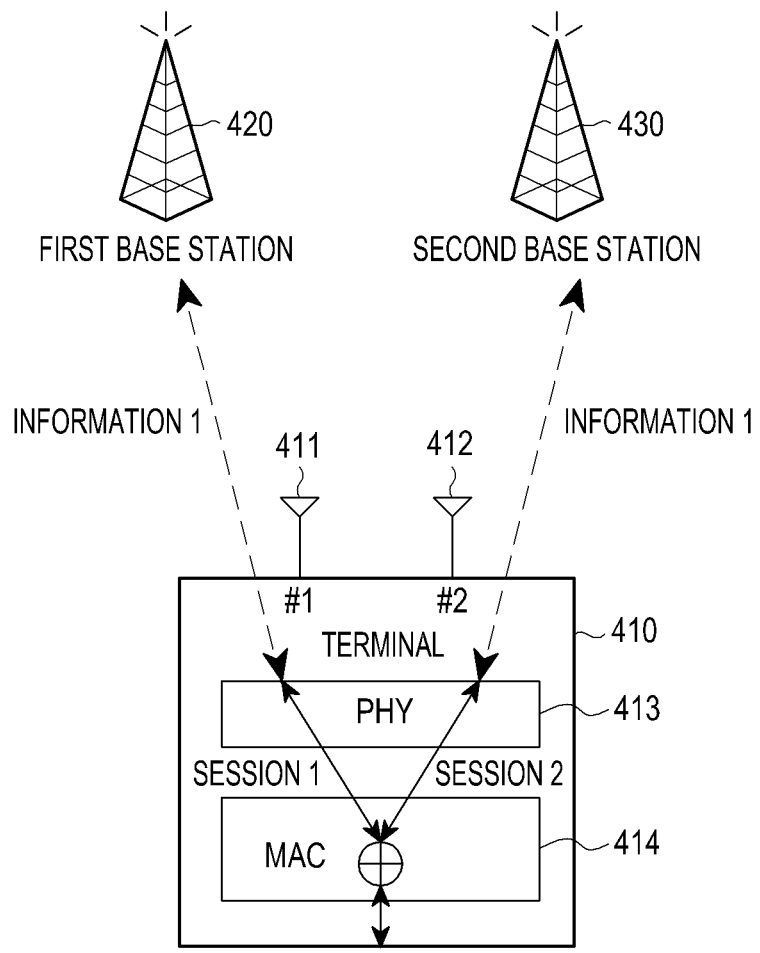
FIG. 4 illustrates an example of an operation of cooperatively transmitting same information through multiple sessions according to an embodiment of the present invention.

FIG. 4 illustrates an example of an operation of cooperatively transmitting same information through multiple sessions according to an embodiment of the present invention.

As illustrated in FIG. 4, a terminal 410 cooperatively transmits same information from/to a first base station 420 and a second base station 430 through multiple sessions upon operating on a same information transmission mode. The terminal 410 equips with a first antenna 411 and a second antenna 412, and consists of a PHY layer 413 and a MAC layer 414. Further, first information of a first session is transmitted to the first base station 420 through the first antenna 411, and first information of a second session is transmitted to the second base station 430 through the second antenna 412. The terminal 410 transmits/receives same information to/from the first base station 420 and the second base station 430, in this case, the terminal 410 cooperatively transmits same information through the multiple sessions by independently processing information in the PHY layer 413 of the terminal, combining information in the MAC layer 414 and transmitting/receiving the first information to/from the first base station 420 and the second base station 430. Here, independent signal transmission/reception in the transmission PHY layer 413 may be implemented in various methods. In one embodiment, the terminal 410 may independently establish a session with the first base station 420 using a first frequency and independently establish a session with the second base station 430 using a second frequency.

In this way, the terminal 410 may cooperatively transmit same information from/to at least two cooperative transmission communication devices through the multiple sessions. Here, same information transmitted through the multiple sessions may be combined in a upper layer including a MAC layer.

Figure 5:
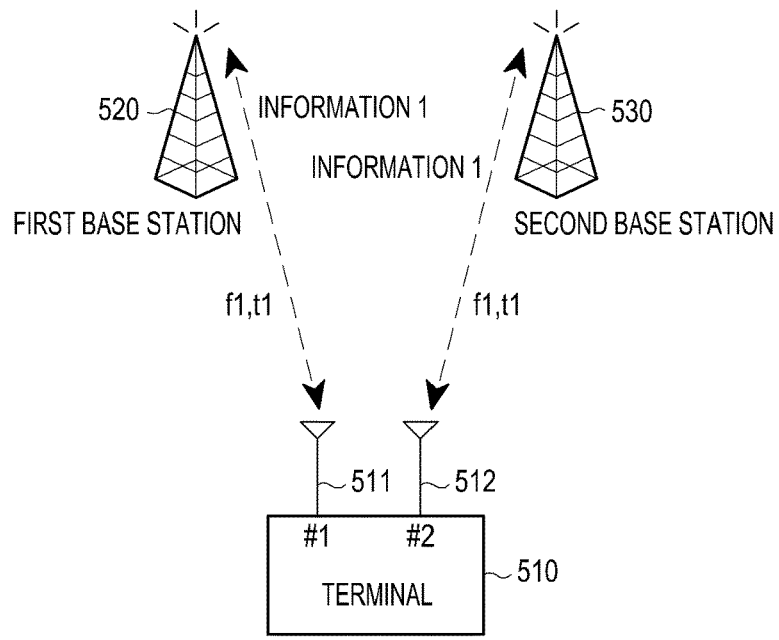
FIG. 5 illustrates an example of an operation of cooperatively transmitting same information using the same resource according to an embodiment of the present invention.
Figure 6:
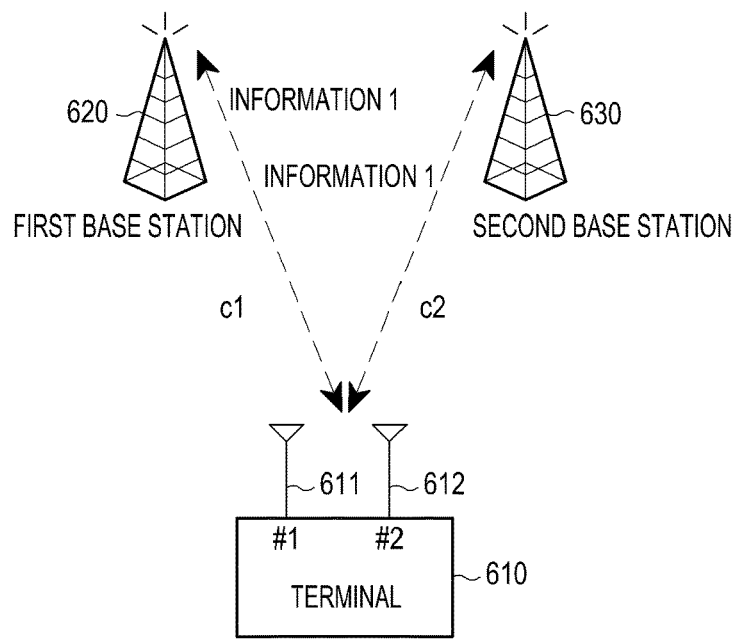
FIG. 6 illustrates an example of an operation of cooperatively transmitting same information using different resources according to an embodiment of the present invention.

A characteristic of cooperatively transmitting same information through the single session or the multi session as described in FIG. 3 and FIG. 4, may be applied to each of a case that same information is cooperatively transmitted through the same resource (FIG. 5) and a case that same information is cooperatively transmitted through different resources (FIG. 6).

FIG. 5 illustrates an example of an operation of cooperatively transmitting same information using the same resource according to an embodiment of the present invention.

As illustrated in FIG. 5, a terminal 510 cooperatively transmits same information from/to a first base station 520 and a second base station 530 through the same resource upon operating in a same information transmission mode. Here, the resource includes at least one of a frequency, time, a code, and a space. The terminal 510 equips with a first antenna 511 and a second antenna 512. Upon transmitting/receiving same information to/from the first base station 520 and the second base station 530 using the same resource, the terminal 510 cooperatively transmits same information using the same resource by sharing a first frequency (f1) and a first time slot t1, using a multi-antenna, and dividing a spectral resource, and transmitting/receiving first information to/from the first base station 520 and the second base station 530.

In this way, the terminal 510 may cooperatively transmit same information from/to at least two cooperative transmission communication devices using the same resource. Upon cooperatively transmitting same information using the same resource, the terminal 510 may cooperatively transmit same information using the same resource by sharing a code and a space as well as a frequency and time.

FIG. 6 illustrates an example of an operation of cooperatively transmitting same information using different resources according to an embodiment of the present invention.

As illustrated in FIG. 6, a terminal 610 cooperatively transmits same information from/to a first base station 620 and a second base station 630 through different resources upon operating in a same information transmission mode. Here, the resource includes at least one of a frequency, time, a code, and a space. The terminal 610 equips with a first antenna 611 and a second antenna 612. Upon transmitting/receiving same information to/from the first base station 620 and the second base station 630 using the different resources, the terminal 610 cooperatively transmits same information using the different resources by transmitting first information using a first code (c1) from/to the first base station 620 and second information using a second code (c2) from/to the second base station 630.

In this way, the terminal 610 may cooperatively transmit same information from/to at least two cooperative transmission communication devices using the different resources. Upon cooperatively transmitting same information using the different resources, the terminal 610 may cooperatively transmit same information using the same resource by differentiating the frequency, the time, the space as well as the code.

Upon operating in a same information transmission mode, a terminal may cooperatively transmit same information using the same transmission scheme. The transmission scheme includes a RAT scheme, a modulation/de-modulation scheme, a channel coding scheme, a source coding scheme, a re-transmission scheme, and the like. The re-transmission scheme includes a Hybrid Automatic Repeat reQuest (HARQ) scheme, an Automatic Repeat reQuest (ARQ) scheme, a Transmission Control Protocol (TCP) re-transmission scheme, and the like.

In one embodiment, if a terminal transmits same information from/to two base stations using the same transmission scheme, the terminal performs cooperative transmission through the same transmission scheme by transmitting/receiving a signal using a code rate ½ Turbo code as a channel coding scheme upon transmitting/receiving same information from/to a first base station and a second base station.

In another embodiment, if a terminal transmits same information from/to two base stations using the same transmission scheme, the terminal performs cooperative transmission through same transmission scheme by transmitting/receiving a signal using the same RAT upon transmitting/receiving same information to/from a first base station and a second base station.

In this way, a terminal may cooperatively transmit same information from/to at least two cooperative transmission communication devices using the same transmission scheme.

Upon operating in a same information transmission mode, a terminal may cooperatively transmit same information using different transmission schemes. The transmission scheme includes a RAT scheme, a modulation/demodulation scheme, a channel coding scheme, a source coding scheme, a re-transmission scheme, and the like. The re-transmission scheme includes a HARQ scheme, an ARQ scheme, a TCP re-transmission scheme, and the like.

In an embodiment, if a terminal transmits same information from/to two base stations using different transmission schemes, the terminal performs cooperative transmission through different transmission schemes by transmitting/receiving a signal to/from a first base station using a BPSK scheme and by transmitting/receiving a signal to/from a second base station using a QPSK scheme upon transmitting/receiving same information to/from the first base station and the second base station.

In another embodiment, if a terminal transmits same information from/to two base stations using different transmission schemes, the terminal performs cooperative transmission through different transmission schemes by transmitting/receiving a signal to/from a first base station using a first RAT and transmitting/receiving a signal to/from a second base station using a second RAT upon transmitting/receiving same information to/from the first base station consisting of the first RAT and the second base station consisting of the second RAT.

In this way, a terminal may cooperatively transmit same information using different transmission schemes from/to at least two cooperative transmission communication devices.

Further, the described same information transmission mode may finally configure eight cooperative transmission modes such as a same information-single session-same resource-same transmission scheme cooperative transmission mode, a same information-single session-same resource-different transmission scheme cooperative transmission mode, a same information-single session-different resource-same transmission scheme cooperative transmission mode, a same information-single session-different resource-different transmission scheme cooperative transmission mode, a same information-multi session-same resource-same transmission scheme cooperative transmission mode, a same information-multi session-same resource-different transmission scheme cooperative transmission mode, a same information-multi session-different resource-same transmission scheme cooperative transmission mode, a same information-multi session-different resource-different transmission scheme cooperative transmission mode by combining three elements such as a session, a resource, and a transmission scheme.

1-2. different information transmission mode: is a transmission mode where a terminal cooperatively transmits different information to at least two cooperative transmission communication devices, or the at least two cooperative transmission communication devices cooperatively transmit different information to the terminal.

Hereinafter, various transmission/reception methods in which a terminal and at least two cooperative transmission communication devices transmit/receive different information will be described with reference to FIG. 7 to FIG. 10. That is, the terminal may cooperatively transmit different information through a single session or multiple sessions and may cooperatively transmit different information through the same resource or different resources.

Figure 7:
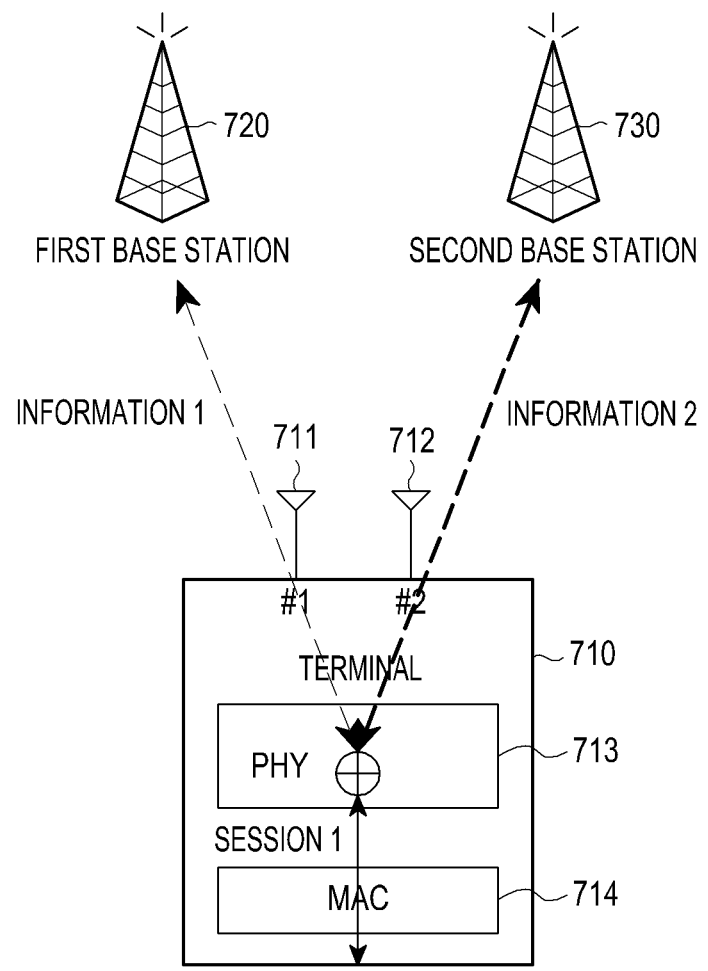
FIG. 7 illustrates an example of an operation of cooperatively transmitting different information through a single session according to an embodiment of the present invention.

FIG. 7 illustrates an example of an operation of cooperatively transmitting different information through a single session according to an embodiment of the present invention.

As illustrated in FIG. 7, a terminal 710 cooperatively transmits different information from/to a first base station 720 and a second base station 730 through a single session upon operating in a different information transmission mode. The terminal 710 equips with a first antenna 711 and a second antenna 712, and includes a PHY layer 713 and a MAC layer 714. Further, first information is transmitted to the first base station 720 through the first antenna 711, and second information is transmitted to the second base station 730 through the second antenna 712. Different information of the single session is same information which is configured to combine in a PHY layer.

The terminal 710 combines a signal in the PHY layer and cooperatively transmits the different information of the single session by transmitting/receiving the first information to/from a first base station and transmitting/receiving the second information to/from a second base station through a multiplexing cooperative transmission.

In this way, a terminal may cooperatively transmit different information of a single session from/to at least two cooperative transmission communication devices.

Figure 8:
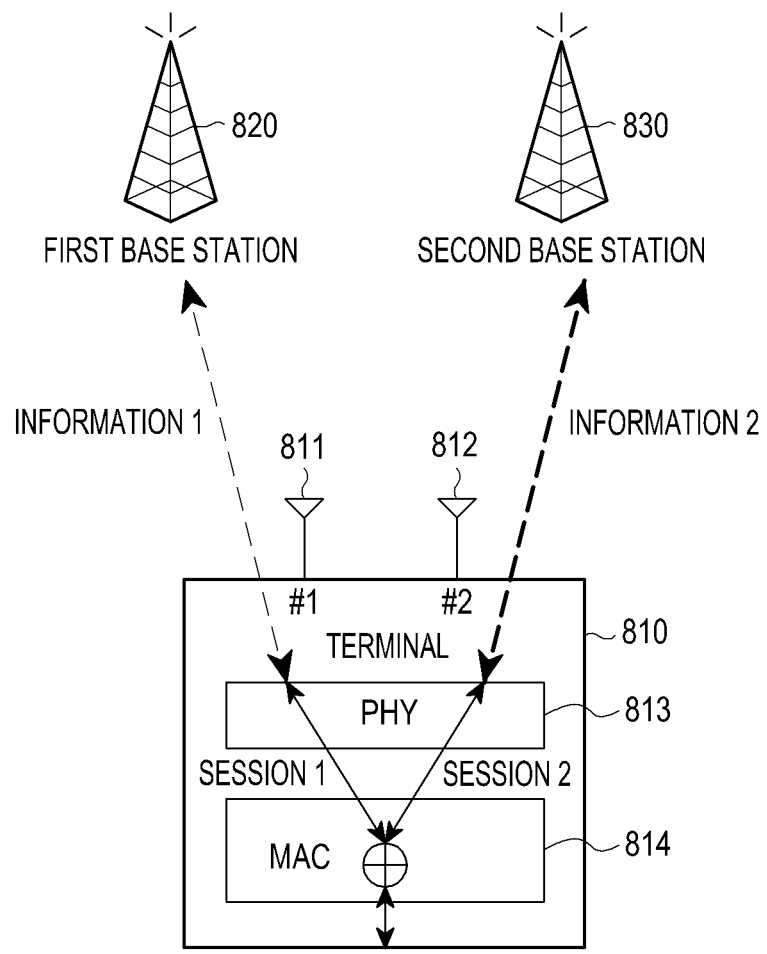
FIG. 8 illustrates an example of an operation of cooperatively transmitting different information through multiple sessions according to an embodiment of the present invention.

FIG. 8 illustrates an example of an operation of cooperatively transmitting different information through multiple sessions according to an embodiment of the present invention.

As illustrated in FIG. 8, a terminal 810 cooperatively transmits different information from/to a first base station 820 and a second base station 830 through multiple sessions upon operating in a different information transmission mode. The terminal 810 equips with a first antenna 811 and a second antenna 812, and includes PHY layer 813 and a MAC layer 814. Further, first information of a first session is transmitted to the first base station 820 through the first antenna 811, and second information of a second session is transmitted to the second base station 830 through the second antenna 812. The first information is different from the second information. The terminal 810 transmits/receives the different information to/from the first base station 820 and the second base station 830, in this case, the terminal 810 cooperatively transmits the different information through the multiple sessions by combining the first session and the second session, by transmitting/receiving the first information of the first session to/from the first base station 820, and by transmitting/receiving the second information of the second session to/from the second base station 830.

In this way, the terminal 810 may cooperatively transmit different information from/to at least two cooperative transmission communication devices through multiple sessions. In this case, the different information transmitted through the multiple sessions may be combined in upper layer including MAC layer.

Figure 9:
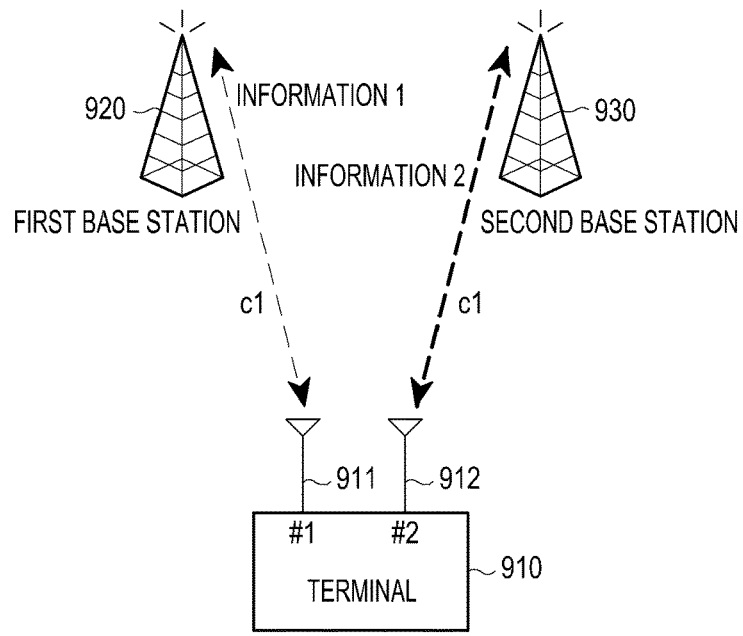
FIG. 9 illustrates an example of an operation of cooperatively transmitting different information using the same resource according to an embodiment of the present invention.
Figure 10:
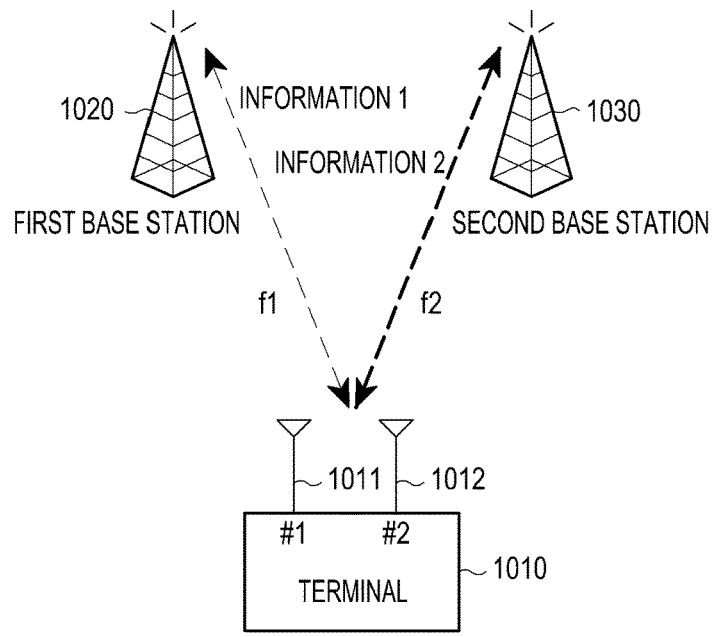
FIG. 10 illustrates an example of an operation of cooperatively transmitting different information using different resources according to an embodiment of the present invention.

A characteristic of cooperatively transmitting different information through a single session or multiple sessions as described in FIG. 7 and FIG. 8, may be applied to each of a case that different information is cooperatively transmitted through the same resource (FIG. 9) and a case that same information is cooperatively transmitted through different resources (FIG. 10).

FIG. 9 illustrates an example of an operation of cooperatively transmitting different information using the same resource according to an embodiment of the present invention.

As illustrated in FIG. 9, a terminal 910 cooperatively transmits different information from/to a first base station 920 and a second base station 930 through the same resource upon operating in a different information transmission mode. Here, the resource includes at least one of a frequency, time, a code, and a space. The terminal 910 equips with a first antenna 911 and a second antenna 912. Upon transmitting/receiving different information to/from the first base station 920 and the second base station 930 using the same resource, the terminal 910 cooperatively transmits the different information using the same resource by sharing a first code (c1), using a multi-antenna, and dividing a spectral resource, transmitting/receiving a first information to/from the first base station 920, and transmitting/receiving a second information to/from the second base station 930.

In this way, the terminal 910 may cooperatively transmit different information from/to at least two cooperative transmission communication devices through the same resource. In this case, the terminal 910 may cooperatively transmit the different information using the same resource by sharing a frequency, time, and a space as well as a code upon cooperatively transmitting the different information using the same resource.

FIG. 10 illustrates an example of an operation of cooperatively transmitting different information using different resources according to an embodiment of the present invention.

As illustrated in FIG. 10, a terminal 1010 cooperatively transmits different information from/to a first base station 1020 and a second base station 1030 through different resources upon operating in a different information transmission mode. Here, the resource includes at least one of a frequency, time, a code, and a space. The terminal 1010 equips with a first antenna 1011 and a second antenna 1012. Upon transmitting/receiving the different information to/from the first base station 1020 and the second base station 1030 using the different resources, the terminal 1010 cooperatively transmits the different information using the different resources by transmitting/receiving first information to/from the first base station 1020 using a first frequency (f1) and transmitting/receiving second information to/from the second base station 1030 using a second frequency (f2).

In this way, the terminal 1010 may cooperatively transmit different information from/to at least two cooperative transmission communication devices through different resources. In this case, the terminal 1010 may cooperatively transmit the different information using the different resources by differentiating time, a code, and a space as well as a frequency upon cooperatively transmitting the different information using the different resources.

Upon operating in a same information transmission mode, a terminal may cooperatively transmit different information using the same transmission scheme. The transmission scheme includes a RAT scheme, a modulation/de-modulation scheme, a channel coding scheme, a source coding scheme, a re-transmission scheme, and the like. The re-transmission scheme includes a Hybrid Automatic Repeat request (HARQ) scheme, an Automatic Repeat reQuest (ARQ) scheme, a Transmission Control Protocol (TCP) re-transmission scheme, and the like.

In an embodiment, if a terminal cooperatively transmits different information using the same transmission scheme from/to two base stations, the terminal may performs cooperative transmission through the same transmission scheme by transmitting a signal using the same channel coding scheme as a Turbo code with a code rate=½ upon transmitting/receiving different information to/from a first base station and a second base station.

In another embodiment, if a terminal cooperatively transmits different information from/to two base stations using the same scheme, the terminal performs cooperative transmission through the same transmission scheme by transmitting/receiving a signal using the same RAT upon transmitting/receiving different information to/from a first base station and a second base station, each consisting of a first RAT.

In this way, a terminal may cooperatively transmit different information from/to at least two cooperative transmission communication devices using the same transmission scheme.

Upon operating in a same information transmission mode, a terminal may cooperatively transmit different information using different transmission schemes. The transmission scheme includes a RAT scheme, a modulation/de-modulation scheme, a channel coding scheme, a source coding scheme, a re-transmission scheme, and the like. The re-transmission scheme includes a HARQ scheme, an RQ scheme, a TCP re-transmission scheme, and the like.

In an embodiment, if a terminal cooperatively transmits different information from/to two base stations using different transmission schemes, the terminal performs cooperative transmission through different transmission schemes by transmitting/receiving a signal to/from a first base station using a BPSK scheme and by transmitting/receiving a signal to/from a second base station using a QPSK scheme upon transmitting/receiving different information to/from the first base station and the second base station.

In another embodiment, if a terminal cooperatively transmits different information from/to two base stations using different transmission schemes, the terminal performs cooperative transmission through different transmission schemes by transmitting/receiving a signal to/from a first base station with a first RAT and by transmitting/receiving a signal to/from a second base station with a second RAT upon transmitting/receiving different information to/from the first base station consisting of the first RAT and the second base station consisting of the second RAT.

In this way, a terminal may cooperatively transmit different information from/to at least two cooperative transmission communication devices using different transmission schemes.

Further, the described different information transmission mode may finally configure eight cooperative transmission modes such as a different information-single session-same resource-same transmission scheme cooperative transmission mode, a different information-single session-same resource-different transmission scheme cooperative transmission mode, a different information-single session-different resource-same transmission scheme cooperative transmission mode, a different information-single session-different resource-different transmission scheme cooperative transmission mode, a different information-mufti session-same resource-same transmission scheme cooperative transmission mode, a different information-multi session-same resource-different transmission scheme cooperative transmission mode, a different information-multi session-different resource-same transmission scheme cooperative transmission mode, a different information-multi session-different resource-different transmission scheme cooperative transmission mode by combining three elements such as a session, a resource, and a transmission scheme.

1-3. hybrid information transmission mode: The hybrid information transmission mode is a transmission mode where a terminal and at least two cooperative transmission communication devices cooperatively transmit/receive different hybrid information which is configured by combining partially same information and partially different information among cooperative transmission paths for each cooperative transmission path.

Hereinafter, a method in which a terminal and at least two cooperative transmission communication devices cooperatively transmits/receives different hybrid information which is configured by combining partially same information and partially different information among cooperative transmission paths for each cooperative transmission path will be described with reference to FIG. 11.

Figure 11:
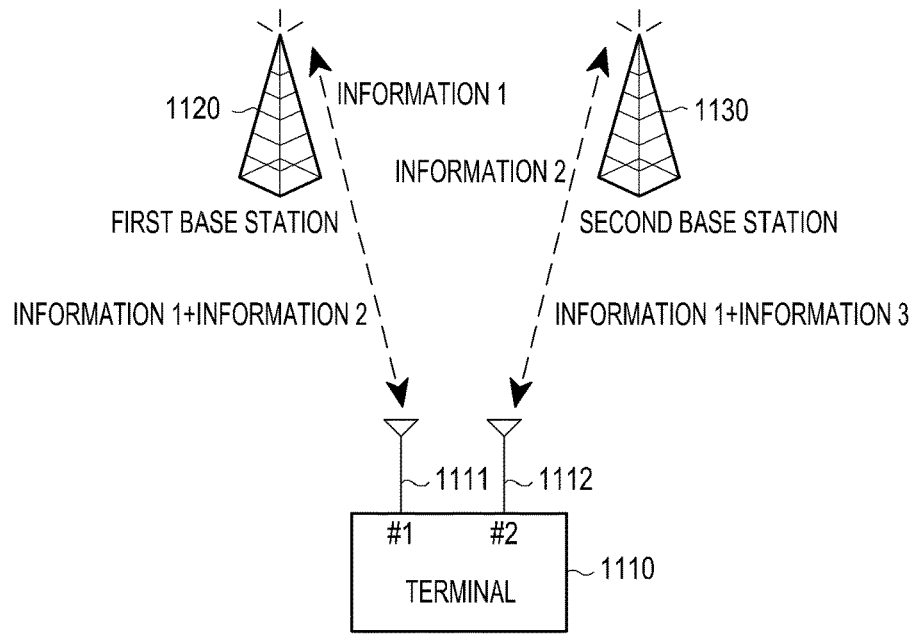
FIG. 11 illustrates an example of an operation of cooperatively transmitting hybrid information according to an embodiment of the present invention.

FIG. 11 illustrates an example of an operation of cooperatively transmitting hybrid information according to an embodiment of the present invention.

As illustrated in FIG. 11, upon operating in a hybrid information transmission mode, a terminal 1110 transmits/receives hybrid information to/from a first base station 1120 and a second base station 1130. The hybrid information denotes information which is combined so that one part of cooperative transmission paths carries identical information and another part of the cooperative transmission paths carries different information. The terminal 1110 equips with a first antenna 1111 and a second antenna 1112. Upon transmitting/receiving different hybrid information to/from the first base station 1120 and the second base station 1130, the terminal 1110 cooperatively transmits different hybrid information by transmitting/receiving hybrid information which is generated by combining first information and second information to/from the first base station 1120 and by transmitting/receiving hybrid information which is generated by combining the first information and third information to/from the second base station 1130.

In this way, the terminal 1110 may cooperatively transmit hybrid information from/to at least two cooperative transmission communication devices.

Upon operating in a hybrid information transmission mode, the terminal 1110 may transmit the part of same information among cooperative transmission paths included in hybrid information in a same information transmission mode as described in FIGS. 3 to 6.

As described in FIG. 3, the terminal 1110 may cooperatively transmit same information through a single session upon operating in a same information transmission mode. Same information of the single session is information which is configured to combine in PHY layer.

As described in FIG. 4, the terminal 1110 may cooperatively transmit same information through multiple sessions upon operating in a same information transmission mode. The multiple sessions may be configured to combine in upper layer including MAC layer.

As described in FIG. 5, the terminal 1110 may cooperatively transmit same information through the same resource upon operating in a same information transmission mode. The resource includes a frequency, time, a code, and a space.

As described in FIG. 6, the terminal 1110 may cooperatively transmit same information through different resources upon operating in a same information transmission mode. The resource includes a frequency, time, a code, and a space.

Upon operating in a same information transmission mode, the terminal 1110 may cooperatively transmit same information using the same transmission scheme. The transmission scheme includes a RAT scheme, a modulation/de-modulation scheme, a channel coding scheme, a source coding scheme, a re-transmission scheme, and the like. The re-transmission scheme includes a HARQ scheme, an ARQ scheme, a TCP re-transmission scheme, and the like.

Upon operating in a same information transmission mode, the terminal 1110 may cooperatively transmit same information using different transmission schemes. The transmission scheme includes a RAT scheme, a modulation/de-modulation scheme, a channel coding scheme, a source coding scheme, a re-transmission scheme, and the like. The re-transmission scheme includes a HARQ scheme, an ARQ scheme, a TCP re-transmission scheme, and the like.

The terminal 1110 may transmit a part of different information among cooperative transmission paths included in hybrid information in a different information transmission mode as described in FIGS. 7 to 10.

That is, as described in FIG. 7, the terminal 1110 may cooperatively transmit different information using a single session upon operating in a different information transmission mode. Different information of the single session is information which is generated to combine in PITY layer.

As described in FIG. 8, the terminal 1110 may cooperatively transmit different information through multiple sessions upon operating in a different information transmission mode. The multiple sessions may be configured to combine in upper layer including MAC layer.

As described in FIG. 9, the terminal 1110 may cooperatively transmit different information through the same resource upon operating in a different information transmission mode. The resource includes a frequency, time, a code, and a space.

As described in FIG. 10, the terminal 1110 may cooperatively transmit different information through different resources upon operating in a different information transmission mode. The resource includes a frequency, time, a code, and a space.

Upon operating in a different information transmission mode, the terminal 1110 may cooperatively transmit different information using the same transmission scheme. The transmission scheme includes a RAT scheme, a modulation/de-modulation scheme, a channel coding scheme, a source coding scheme, a re-transmission scheme, and the like. The re-transmission scheme includes a HARQ scheme, an ARQ scheme, a TCP re-transmission scheme, and the like.

Upon operating in the different information transmission mode, the terminal 1110 may cooperatively transmit the different information using different transmission schemes. The transmission scheme includes a RAT scheme, a modulation/de-modulation scheme, a channel coding scheme, a source coding scheme, a re-transmission scheme, and the like. The re-transmission scheme includes a HARQ scheme, an ARQ scheme, a TCP re-transmission scheme, and the like.

Further, the described hybrid information transmission mode may configure various cooperative transmission modes by combining three elements of a session, a resource, and a transmission scheme for each of a part of same information and a part of different information.

1-4. partial set cooperative information transmission mode: The partial set cooperative information transmission mode denotes a transmission mode where a terminal does not transmit/receive a signal to/from a part of at least two cooperative transmission communication devices and performs cooperative transmission from/to the remaining cooperative transmission communication devices.

Hereinafter, a transmission mode in which a terminal does not transmit/receive a signal and performs cooperative transmission from/to a part of at least two cooperative transmission communication devices will be descried with reference to FIG. 12.

Figure 12:
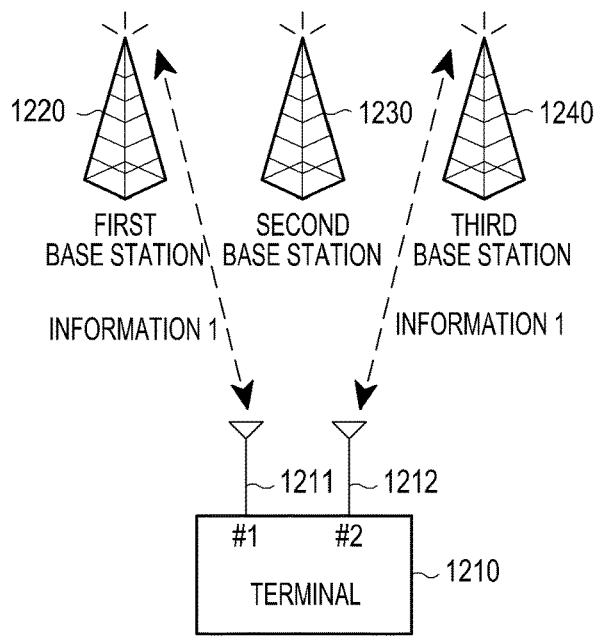
FIG. 12 illustrates an example of an operation of cooperatively transmitting using a partial set cooperative transmission mode according to an embodiment of the present invention.

FIG. 12 illustrates an embodiment of cooperative transmission using a partial set cooperative transmission mode according to an embodiment of the present invention.

As illustrated in FIG. 12, upon operating in a partial set cooperative transmission mode, a terminal 1210 performs cooperative transmission from/to a part of at least two cooperative transmission communication devices which transmits/receives a signal using one of a same information transmission mode, a different information transmission mode, and a hybrid information transmission mode.

That is, the terminal 1210 transmits/receives same information to/from a first base station 1220 to a third base station 1240. The terminal 1210 equips with a first antenna 1211 and a second antenna 1212. Upon transmitting/receiving same information using a partial set cooperative transmission mode to/from the first base station 1220, a second base station 1230, and the third base station 1240, the terminal 1210 cooperatively transmits same information using the partial set cooperative transmission mode by transmitting/receiving a signal to/from the first base station 1220 and the third base station 1240 and by not transmitting/receiving a signal to/from the second base station 1230.

Like this, the terminal 1210 may transmit cooperatively different information and hybrid information as well as same information using a partial set cooperative transmission mode from/to at least two cooperative transmission communication devices.

A method of transmitting same information or different information according to a same information transmission mode, a different information transmission mode, a hybrid information transmission mode, and a partial set cooperative transmission mode among a terminal and at least one cooperative transmission communication devices for each single session or each multi-session in a transmission mode determination unit 210 of a mobile terminal has been described with reference to FIG. 3 to FIG. 12.

Hereinafter, consideration elements for determining a cooperative transmission mode will be described.

A terminal considers a channel condition, a connection state, a RAT preference, a service price, a neighbor list order, a required bandwidth condition, a required transmission rate condition, a required error rate condition, an access condition, a distance between a cooperative transmission communication device and the terminal, loading rate of the cooperative transmission communication device, and the like in order to determine a cooperative transmission mode. The consideration elements will be described below.

channel condition: A channel condition includes a channel characteristic related quality element, a space characteristic related quality element, and a channel information usage method, and may be classified below.

The channel characteristic related quality element includes a Received Signal Strength Indicator (RSSI), a Signal-to-Noise Ratio (SNR), a Signal-to-Interference plus Noise Ratio (SINR), an error rate, a channel capacity, a providable transmission rate, a variance of the providable transmission rate, an outage rate, and the like which are determined according to a channel characteristic such as a fading, path attenuation, shadowing, delay spreading, multi path, intra cell interference, inter cell interference, Doppler, an antenna gain, a channel allocation, and the like, and may be used as a channel characteristic quality element.

The RSSI denotes an index indicating received signal strength measured in a receiver, and the SNR is a signal to noise ratio and denotes a ratio of signal power to noise power. The SINR is signal to noise-interference ratio and denotes a ratio of signal power to interference and noise power, and an error rate is an error probability and includes a Bit Error Rate (BER), a Block Error Rate (BLER), a Frame Error Rate (FER), a Packet Error Rate (PER), and the like. Channel capacity denotes maximal information quantity transmittable without an error through a channel. The providable transmission rate denotes a transmission rate which is really possible by considering channel characteristic elements, may be expressed as a format such as an instantaneous transmission rate or an average transmission rate, and includes a total transmission rate, a transmission rate for each user, a transmission rate for each stream, and the like. A variance of the providable transmission rate denotes a change rate of the providable transmission rate according to a channel characteristic. The outage rate denotes a communication outage rate which will occur if channel quality is less than or equal to a threshold according to a communication outage criterion, and the communication outage criterion includes a RSSI, an SNR, an SINR, an error rate, a channel capacity, a providable transmission rate, and the like. In one embodiment, if the communication outage criterion is set to 0 dB SNR, a outage rate of a user is determined according to a probability that the user experiences a channel in which an SNR is less than or equal to 0 dB.

A space characteristic quality element is a quality element for additionally considering a space characteristic as well as a channel characteristic quality element if a signal is transmitted to a plurality of communication devices using a plurality of antennas, and includes a cross-correlation among user channels, a cross-correlation among antennas, a rank of a channel matrix, a channel quality element for each stream, and the like, and an element related to a space characteristic may be used as a space characteristic channel quality element. The cross-correlation among the user channels is an index indicating a similar degree among channel characteristics of the user channels. If the cross-correlation among the user channels is high, channel characteristics are similar, so a performance of a multi-user space division multiplexing transmission decreases. The cross-correlation among the antennas is an index indicating a similar degree of channel characteristics among channels which are generated through a plurality of antennas if a reception communication device uses the plurality of antennas. If the cross-correlation among the antennas is high, channel characteristics among the antennas are similar, so a performance of a space division multiplexing transmission using a multi-antenna decreases. The rank of the channel matrix is an index indicating the number of data streams which are independently usable for a matrix channel which is generated between a transmitter and a receiver. The channel quality element for each stream denotes strength of each stream corresponding to the number of the data streams which are independently usable for the matrix channel which is generated between the transmitter and the receiver. The channel quality element for each stream includes the described RSSI, SNR, SINR, error rate, channel capacity, providable transmission rate, variance of the providable transmission rate, outage rate, and the like, connection state: A connection state denotes whether each communication device connects to a terminal and a connection type of each communication device. The terminal performs cooperative transmission from/to at least two cooperative transmission communication devices by determining a cooperative transmission mode-transmission-targeting communication device set according to the connection state.

The connection state includes a current connection, a new connection, and no connection. The current connection denotes a connection state for at least one communication device included in a cooperative transmission communication device set which is currently connecting to the terminal, and the new connection denotes a connection state for at least one communication device included in a cooperative transmission communication device set to which the terminal will newly connect. Further, no-connection denotes a connection state for at least one communication device which is not included in a cooperative transmission communication device set to which the terminal currently connects and a cooperative transmission communication device set to which the terminal will newly connect.

RAT preference: A RAT preference denotes an order which is preferred according to a RAT of a user or a terminal. The terminal performs cooperative transmission from/to at least two cooperative transmission communication devices by determining a cooperative transmission mode-transmission-targeting communication device set according to the RAT preference.

service price: A service price denotes a price which a user pays in order to use a communication service. A terminal performs cooperative transmission from/to at least two cooperative transmission communication devices by determining a cooperative transmission mode-transmission-targeting communication device set according to the service price.

neighbor list order: A neighbor list order is an order of a RAT and/or a communication device allocated to a neighbor list which a network provides. A terminal performs cooperative transmission from/to at least two cooperative transmission communication devices by determining a cooperative transmission mode-transmission-targeting communication device set according to the neighbor list order.

required bandwidth condition: A required bandwidth condition denotes a bandwidth of a channel which a terminal requires for smoothly receiving a service through cooperative transmission. The terminal performs cooperative transmission from/to at least two cooperative transmission communication devices by determining a cooperative transmission mode-transmission-targeting communication device set according to the required bandwidth, required transmission rate condition: A required transmission rate condition denotes a transmission rate which a terminal requires for smoothly receiving a service through cooperative transmission. The terminal performs cooperative transmission from/to at least two cooperative transmission communication devices by determining a cooperative transmission mode-transmission-targeting communication device set according to the required transmission rate.

required error rate condition: A required error rate condition denotes an error rate which a terminal requires for smoothly receiving a service through cooperative transmission. The terminal performs cooperative transmission from/to at least two cooperative transmission communication devices by determining a cooperative transmission mode-transmission-targeting communication device set according to the required error rate.

access condition: An access condition is a condition related to an access environment among communication devices, and is determined according to elements including available types of RATs, the number of available communication devices for each RAT, an availability for each communication device, load for each communication device, a user access condition, and the like.

The available types of RATs denotes nearby types of RATs to which a terminal may connect, and the number of available communication devices for each RAT denotes the number of cooperative transmission communication devices to which the terminal may connect for each RAT. The availability for each communication device denotes whether a terminal may accept cooperative transmission communication devices that are nearby the terminal, and the load for each communication device denotes resource load for the cooperative transmission communication devices that are nearby the terminal. The user access condition denotes a reason why a terminal performs cooperative transmission from/to neighbor cooperative transmission communication devices, and includes an initial access, a handover access, and the like. The handover access includes an intra-cell handover access, an inter-cell handover access, a heterogeneous network handover access, and the like. The intra-cell handover access is an operation in which a terminal performs a handover access if the terminal moves among areas within a single cell. The inter-cell handover access is an operation in which a terminal performs a handover access if the terminal moves among neighbor cells. The heterogeneous network handover access is an operation in which a terminal performs a handover access if the terminal moves among cells of which RATs are different. In one embodiment, if a terminal moves from a WCDMA area to a WLAN area, the terminal performs a heterogeneous network handover access.

distance between a cooperative transmission communication device and a terminal: A distance between a cooperative transmission communication device and a terminal denotes a distance among the terminal and at least two cooperative transmission communication devices. The terminal performs cooperative transmission from/to the at least two cooperative transmission communication devices by determining a cooperative transmission mode-transmission-targeting communication device set according to the distance between the cooperative transmission communication device and the terminal.

loading rate of a cooperative transmission communication device: Loading rate of a cooperative transmission communication device denotes resource loading rate of each cooperative transmission communication device. A terminal performs cooperative transmission from/to at least two cooperative transmission communication devices by determining a cooperative transmission mode-transmission-targeting communication device set according to the loading rate of the cooperative transmission communication device.

Hereinafter, a mode-transmission-targeting communication device set determination unit 220 of a terminal will be described below.

2. Mode-Transmission-Targeting Communication Device Set Determination Unit 220

Upon cooperatively transmitting from/to at least two cooperative transmission communication devices, a terminal according to the present invention determines at least one communication device to which the terminal will transmit information on the cooperative transmission mode determined through the transmission mode determination unit 210. Here, the terminal determines at least one communication device by considering consideration elements for determining a cooperative transmission mode-transmission-targeting communication device set. The consideration elements will be described below.

In a case that a terminal determines a cooperative transmission mode-transmission-targeting communication device set, there are following cases.

2-1. case that a terminal determines at least one communication device included in a cooperative transmission communication device set to which the terminal currently connects:

A terminal may provide information in order that at least one cooperative transmission communication device to which the terminal connects controls cooperative transmission by providing determined cooperative transmission mode information to at least one communication device included in a cooperative transmission communication device set to which the terminal currently connects.

2-2. case that a terminal determines at least one communication device included in a cooperative transmission communication device set to which the terminal will newly connect:

A terminal provides information in order that at least one cooperative transmission communication device to which the terminal will newly connect controls cooperative transmission by providing determined cooperative transmission mode information to at least one communication device included in a cooperative transmission communication device set to which the terminal intends to newly connect.

The terminal may provide the determined transmission mode information to the at least one communication device included in the cooperative transmission communication device set to which the terminal intends to newly connect and control cooperative transmission.

2-3. case that a terminal determines at least one communication device which is not included in a cooperative transmission communication device set to which the terminal currently connects and a cooperative transmission communication device set to which the terminal will newly connect:

The terminal provides information in order that at least one communication device which is not connected to the terminal controls cooperative transmission by providing determined transmission mode information to the at least one communication device which is not included in the cooperative transmission communication device set to which the terminal currently connects and the cooperative transmission communication device set to which the terminal will newly connect.

The terminal provides information in order that the at least one communication device which is not connected to the terminal controls the cooperative transmission by transmitting the determined transmission mode information to a coordinator which manages a cooperation of cooperative transmission communication devices.

In order to determine the at least one communication device to which the terminal will transmit the determined cooperative transmission mode information, the terminal considers a channel condition, a connection state, a RAT preference, a service price, an neighbor list order, a required bandwidth condition, a required transmission rate condition, a required error rate condition, an access condition, a distance from a cooperative transmission communication device and the terminal, loading rate of the cooperative transmission communication device, and the like.

3. Cooperative Transmission Communication Device Set Determination Unit 230

The cooperative transmission communication device set determination unit 230 determines at least two cooperative transmission communication devices for cooperative transmission to/from the terminal by considering consideration elements for determining a cooperative transmission communication device set. The cooperative transmission communication device includes a base station, a relay, a repeater, a femto cell base station, a relay transmission femto cell base station, a terminal, a relay transmission terminal, and the like. A part or all of at least two cooperative transmission communication devices included in a cooperative transmission communication device set determined by the cooperative transmission communication device set determination unit 230 may consist of the same RAT or different RATs.

In order to determine the cooperative transmission communication device set, the terminal considers a channel condition, a connection state, a RAT preference, a service price, an neighbor list order, a required bandwidth condition, a required transmission rate condition, a required error rate condition, an access condition, a distance from a cooperative transmission communication device and the terminal, loading rate of the cooperative transmission communication device, and the like.

4. Antenna Set Determination Unit 240 and Antenna Common Use Type Determination Unit 250

The antenna set determination unit 240 determines an antenna set for each cooperative transmission communication device by considering consideration elements for an antenna set determination, and the antenna common use type determination unit 250 determines a common use type of antenna sets for each cooperative transmission communication device by considering consideration elements for an antenna set common use type determination. The consideration elements will be described below.

In more detail, the terminal 200 determines an antenna set for connecting to each of at least two cooperative transmission communication devices for cooperative transmission to/from the terminal 200 upon cooperatively transmitting from/to the at least two cooperative transmission communication devices. Here, an antenna set for each cooperative transmission communication device consists of at least one antenna. At least one antenna included in an antenna set for a terminal to transmit/receive to/from one cooperative transmission communication device may be included in an antenna set for transmitting/receiving to/from other cooperative transmission communication device. That is, a part or all of communication devices forming a cooperative transmission communication device set for a terminal to cooperatively transmit may use commonly all or a part of antennas included in an antenna set for each cooperative transmission communication device. An embodiment in which a terminal determines an antenna set for each cooperative transmission communication device and a common use type of antenna sets for each cooperative transmission communication device in order to cooperatively transmit from/to at least two cooperative transmission communication devices will be followed. In the next embodiment, for a detailed description, a terminal equips with four antennas, however, it will be understood by those of ordinary skill in the art that this may be applicable to a communication device which equips with at least one antenna.

A terminal may establish a connection using different resources or the same resource if the terminal uses commonly at least one antenna included in an antenna set for each cooperative transmission communication device. Hereinafter, various embodiments of determining an antenna set will be described.

4-1. method for determining two antenna sets, each consisting of one antenna:
  method for determining antenna sets for two respective cooperative transmission communication devices, each consisting of one different antenna.

Figure 13:
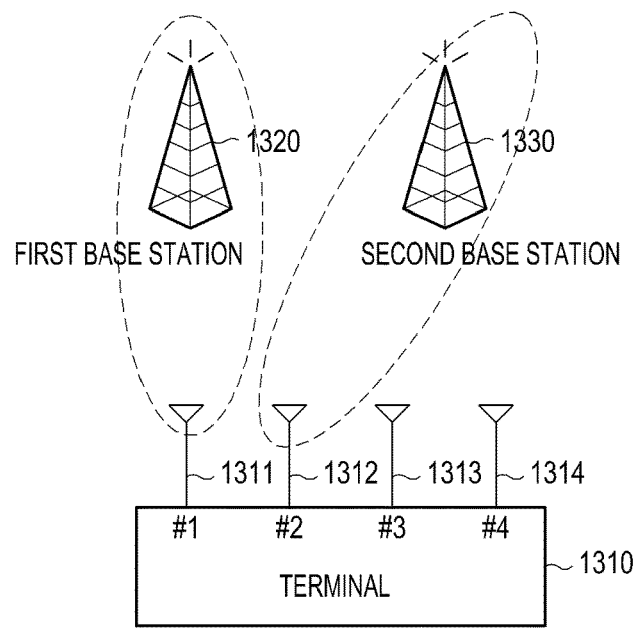
FIG. 13 illustrates an example of a method for determining antenna sets for each two cooperative transmission communication devices, each consisting of one different antenna according to an embodiment of the present invention.

FIG. 13 illustrates an example of a method for determining antenna sets per two cooperative transmission communication devices, each consisting of one different antenna according to an embodiment of the present invention.

As described in FIG. 13, a terminal 1310 equips with a first antenna 1311, a second antenna 1312, a third antenna 1313, and a fourth antenna 1314. The first antenna 1311 may establish a connection to a first base station 1320, and the second antenna 1312 may establish a connection to a second base station 1330. That is, upon determining an antenna set for each cooperative transmission communication device in order to establish a connection to two base stations, a terminal equipped with four antennas may establish a connection to the first base station 1320 using a first antenna set consisting of the first antenna 1311, and a connection to the second base station 1330 using a second antenna set consisting of the second antenna 1312. However, it will be understood by those of ordinary skill in the art that the establishment is just an embodiment, and various connections may be established.

In this way, each of cooperative transmission communication devices determines antenna sets for each cooperative transmission communication device consisting of at least one different antenna, so the terminal 1310 may establish a connection.
  method for determining antenna sets for two respective cooperative transmission communication devices which are configured to use commonly one antenna.

Figure 14:
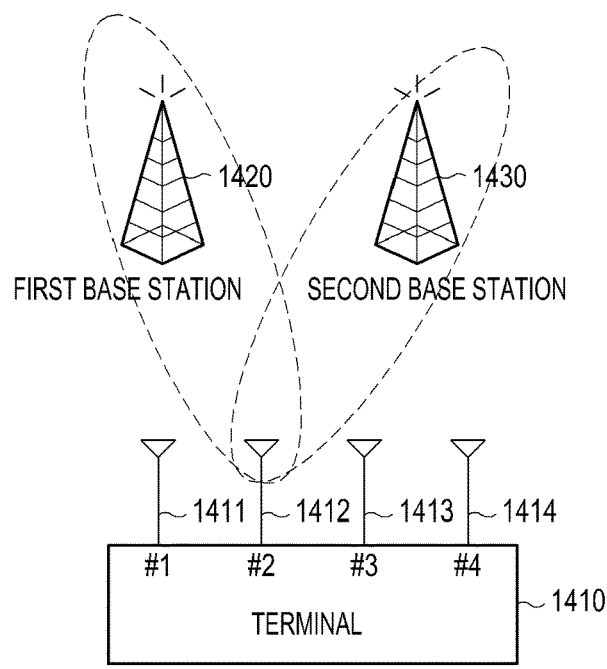
FIG. 14 illustrates an example of a method for determining antenna sets for each two cooperative transmission communication devices which are configured to use commonly one antenna according to an embodiment of the present invention.

FIG. 14 illustrates an example of a method for determining antenna sets for two respective cooperative transmission communication devices which are configured to use commonly one antenna according to an embodiment of the present invention.

As described in FIG. 14, a terminal 1410 equips with a first antenna 1411, a second antenna 1412, a third antenna 1413, and a fourth antenna 1414. The second antenna 1412 may establish a connection to a first base station 1420, and may simultaneously establish a connection to a second base station 1430. That is, upon determining an antenna set for each cooperative transmission communication device in order to establish a connection to two base stations, a terminal equipped with 4 antennas may establish a connection to the first base station 1420 using a first antenna set consisting of the second antenna 1412, and a connection to the second base station 1430 using a second antenna set consisting of the second antenna 1412. However, it will be understood by those of ordinary skill in the art that the establishment is just an embodiment, and various connections may be established.

In this way, each of cooperative transmission communication devices determines antenna sets for each cooperative transmission communication device consisting of at least one different antenna, so the terminal 140 may establish a connection.

4-2. method for determining two antenna sets, each consisting of two antennas:
  method for antenna sets for two respective cooperative transmission communication devices, each consisting of two different antennas.

Figure 15:
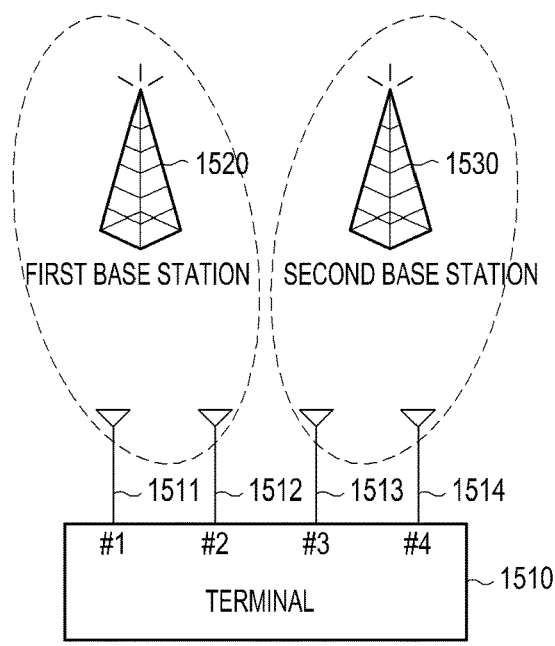
FIG. 15 illustrates an example of a method for determining antenna sets for each two cooperative transmission communication devices, each consisting of two different antennas according to an embodiment of the present invention.

FIG. 15 illustrates an example of a method for determining antenna sets for two respective cooperative transmission communication devices, each consisting of two different antennas according to an embodiment of the present invention.

As described in FIG. 15, a terminal 1510 equips with a first antenna 1511, a second antenna 1512, a third antenna 1513, and a fourth antenna 1514. The first antenna 1511 and the second antenna 1512 may establish a connection to a first base station 1520, and the third antenna 1513 and the fourth antenna 1514 may establish a connection to a second base station 1530, That is, upon determining an antenna set for each cooperative transmission communication device in order to establish a connection to two base stations, a terminal equipped with four antennas may establish a connection to the first base station 1520 using a first antenna set consisting of the first antenna 1511 and the second antenna 1512, and a connection to the second base station 1530 using a second antenna set consisting of the third antenna 1513 and the fourth antenna 1514. However, it will be understood by those of ordinary skill in the art that the establishment is just an embodiment, and various connections may be established.

In this way, each of cooperative transmission communication devices determines antenna sets for each cooperative transmission communication device consisting of two different antennas so the terminal 150 may establish a connection.
  method for determining antenna sets for two respective cooperative transmission communication devices which are configured to use commonly two antennas.

Figure 16:
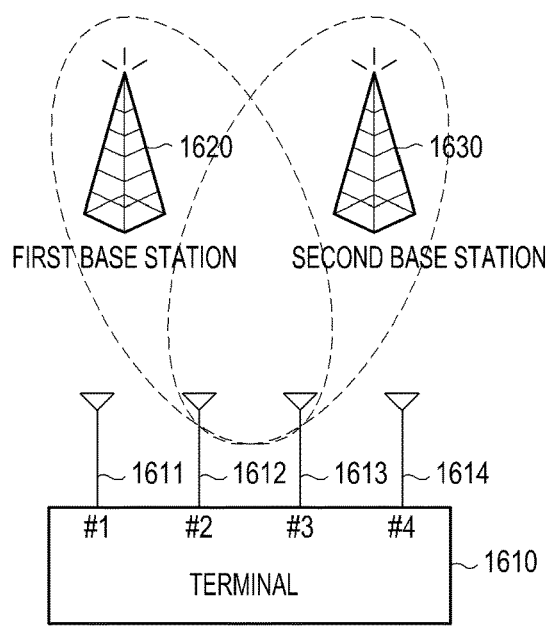
FIG. 16 illustrates an example of a method for determining antenna sets for each two cooperative transmission communication devices which are configured to use commonly two antennas according to an embodiment of the present invention.

FIG. 16 illustrates an example of a method for determining antenna sets for two respective cooperative transmission communication devices which are configured to use commonly two antennas according to an embodiment of the present invention.

As described in FIG. 16, a terminal 1610 equips with a first antenna 1611, a second antenna 1612, a third antenna 1613, and a fourth antenna 1614. The second antenna 1612 and the third antenna 1613 may establish a connection to a first base station 1620 and the second base station 1630. That is, upon determining an antenna set for each cooperative transmission communication device in order to establish a connection to two base stations, a terminal equipped with four antennas may establish a connection to the first base station 1620 using a first antenna set consisting of the second antenna 1612 and the third antenna 1613, and a connection to the second base station 1630 using a second antenna set consisting of the second antenna 1612 and the third antenna 1613. However, it will be understood by those of ordinary skill in the art that the establishment is just an embodiment, and various connections may be established.

In this way, each of cooperative transmission communication devices determines antenna sets for each cooperative transmission communication device consisting of at least two antennas, so the terminal 1610 may establish a connection.

In order to determine an antenna set for each cooperative transmission communication device and a common use type of antenna sets for each cooperative transmission communication device, a terminal considers a channel condition, a connection state, a RAT preference, a service price, an neighbor list order, a required bandwidth condition, a required transmission rate condition, a required error rate condition, an access condition, a distance between a cooperative transmission communication device and the terminal, loading rate of the cooperative transmission communication device, and the like.

Hereinafter, an antenna combining method will be described below.

5. Antenna Combining Method Determination Unit 260

An antenna combining method determination unit 260 of a terminal determines an antenna combining method of each of antenna sets for each cooperative transmission communication device by considering consideration elements for determining an antenna combining method. The consideration elements will be described.

A terminal forms a directional beam by multiplying each antenna signal by a combination factor using an antenna set consisting of at least two antennas. The terminal may decrease a same channel interference using a direction of a signal, or increase resource efficiency through a Space-Division Multiple Access (SDMA), or transmit and/or receive a signal in order to have a high signal gain. The terminal may determine a direction of a desired signal by forming a directional beam for all directions by adjusting a combination factor, and may increase a quality of a signal or substantially increase a transmission rate by combining antenna signals in order to facilitate a diversity transmission or a space multiplexing transmission if a channel among antenna configuration elements is influenced by an independent fading.

Hereinafter, various embodiments of configuring an antenna combination for each antenna set using antenna set consisting of at least two antennas will be followed.

5-1. Omnidirectional Combination

A terminal combines at least two antennas in order to transmit and/or receive a signal by forming a beam which omni directionally radiates by selecting at least one antenna forming an antenna set and using the selected at least one antenna. Or the terminal may form a beam which is omni-directionally radiated using another method in which an omnidirectional beam is formed using a method of simultaneously transmitting the same signal through a plurality of antennas which forms beams, each being for a different direction.

In one embodiment for the omnidirectional combination, if a terminal operates an omnidirectional mode using an antenna set consisting of at least two antennas, the terminal may form a beam which omni-directionally radiates and transmit and/or receive a signal through the formed beam by selecting at least one antenna included in the antenna set and operating the selected antenna in all directions. Or, an omnidirectional combining method using three antennas will be described below.

Figure 17:
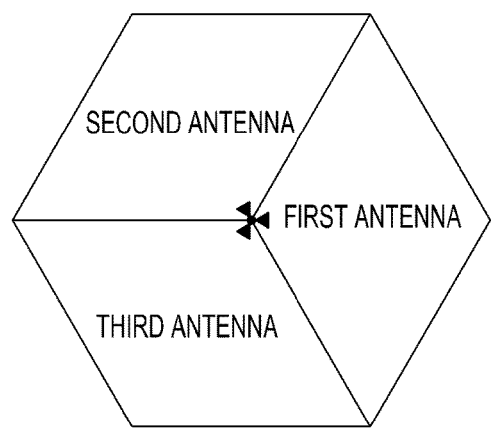
FIG. 17 illustrates an example of an omnidirectional combining method using antennas according to an embodiment of the present invention.

FIG. 17 illustrates an example of an omnidirectional combining method using antennas according to an embodiment of the present invention.

As illustrated in FIG. 17, a terminal may form a beam which omni-directionally radiates, and transmit and/or receive a signal through the beam by operating in order that the terminal forms a beam in which a beam width of each antenna is 120° and a difference among beam directions is 120° using an antenna set consisting of three antennas. Here, a beam width, a beam pattern, and the like may be adjusted according to an antenna design, and various omnidirectional combinations are possible according to the beam width, the number of antennas, and the like. Various omnidirectional combinations are possible by forming a beam which omni-directionally radiates, and transmitting and/or receiving a signal through the formed beam using other method in which an omni-directional beam is formed.

5-2. Directional Combination

A terminal combines at least two antennas in order to transmit and/or receive a signal by forming at least one directional beam which radiates in a specific direction through an adaptation of a combination factor of each antenna.

In a case that a terminal may use channel state information such as a case that there is a channel information feedback as an embodiment for the directional combination, the terminal may transmit and/or receive a signal by forming a beam which radiates in a direction which the terminal intends to communicate by adjusting a combination factor of each antenna using the channel state information. Further, the terminal may control a direction of a beam, the number of directional beams, a beam width, a beam pattern, and the like through an adaptation of a combination factor of each antenna, and transmit and/or receive a signal by forming at least one directional beam which radiates in a desired direction through this. The terminal may operate various directional modes according to a directional adaptation period, a beam width, the number of directional beams, a beam pattern, and the like.

5-3. Diversity Combination

A transmitter transmits a signal using a diversity transmission method such as a transmit diversity method, an Alamouti diversity method, an STBC (Space Time Block Code) method, and a receiver receives by combining received signals using a diversity reception method such as a general diversity reception method. Upon using two antennas, the transmitter may transmit a signal using the transmit diversity method by simultaneously transmitting the same signal through the two antennas, or transmit a signal using the Alamouti diversity method or the STBC method through a space coding transmission using the two antennas and a time coding transmission using additional time.

Figure 18:
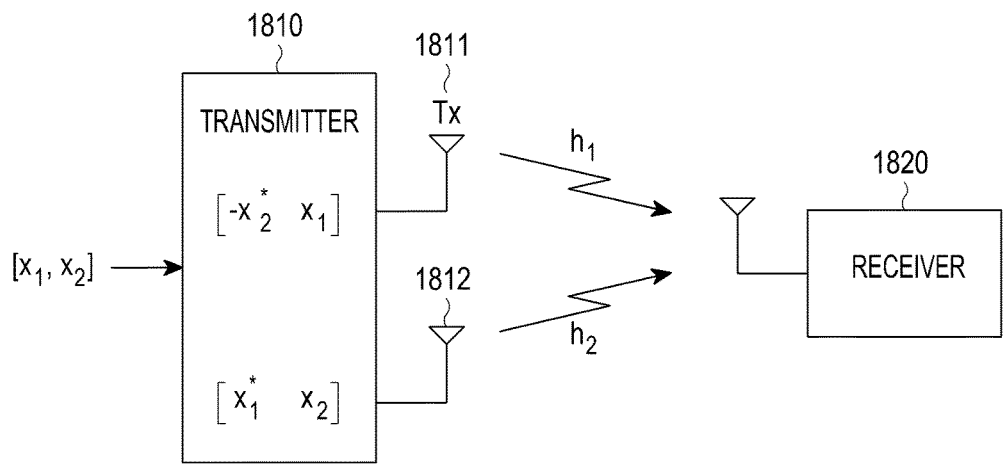
FIG. 18 illustrates an example of a diversity combining method of diversity transmitting/receiving a signal using an Alamouti diversity method through two antennas in a diversity combination according to the present invention.

FIG. 18 illustrates an example of a diversity combining method of diversity transmitting/receiving a signal using an Alamouti diversity method using two antennas in a diversity combination according to the present invention.

As illustrated in FIG. 18, upon transmitting a signal, a transmitter 1810 transmits a signal so as to maintain orthogonality among signals. After receiving the signal, a receiver 1820 may maximally obtain a diversity gain through a simple linear decoding process. The transmitter 1810 equips with at least one antenna set 1811, 1812. Each antenna set includes at least one antenna. The receiver 1820 equips with one antenna set, and one antenna set includes at least one antenna. In order to maintain the orthogonality, the transmitter 1810 transmits a signal $x_1$ through a first antenna and a signal $x_2$ through a second antenna in a first time slot, and transmits a signal $-x_2^*$ through the first antenna and a signal $x_1^*$ through the second antenna in a second time slot. So, the orthogonality may be maintained.

A decoding method of the receiver 1820 will be followed. If it will be assumed that a channel does not change during two time slots (from a first time slot to a second time slot), a signal received during the first time slot denoted as $r_1$ and a signal received during the second time slot denoted as $r_2$ may be expressed Equation (1).

$$r_1 = h_1 x_1 + h_2 x_2 + n_2,$$

$$r_2 = h_1 x_2^* + h_2 x_1^* + n_2, \tag{1}$$

Equation (1) is expressed as Equation (2) by expressing in a vector format after performing a conjugate on the signal received during the second time slot.

$$y = \begin{bmatrix} r_1 \\ r_2^* \end{bmatrix} = \begin{bmatrix} h_1 & h_2 \\ h_2^* & -h_1^* \end{bmatrix} \begin{bmatrix} x_1 \\ x_2 \end{bmatrix} + \begin{bmatrix} n_1 \\ n_2^* \end{bmatrix} = H_{\mathit{eff}} x + n \quad (2)$$

In Equation (2), an effective channel matrix $H_{\mathit{eff}}$ satisfies a condition of $H_{\mathit{eff}}^H H_{\mathit{eff}} = (|h_1|^2 + |h_2|^2) I_2$. In Equation (2) is expressed as Equation (3) by multiplexing Equation (2) by Hermitian of the effective channel matrix.

$$z = H_{\mathit{eff}}^H y = (|h_1|^2 + |h_2|^2) x + \tilde{n}. \quad (3)$$

In Equation (3), $\tilde{n}$ satisfies a condition of $\tilde{n} = H_{\mathit{eff}}^H n$. So, each symbol may be expressed as Equation (4). So, original signals x1, x2 may be detected from this.

$$z_1 = (|h_1|^2 + |h_2|^2) x_1 + \tilde{n}_1$$
$$z_2 = (|h_1|^2 + |h_2|^2) x_2 + \tilde{n}_2 \quad (4)$$

If the terminal operates a diversity mode using a transmit diversity method through two antennas, transmit diversity transmission is possible by transmitting an input signal x defined in Equation (5) in order to transmit the same signal s1 through each antenna.

$$x = \sqrt{\frac{E_S}{2}} \begin{bmatrix} S_1 \\ S_2 \end{bmatrix} \quad (5)$$

In this way, various types of transmit diversity transmission are possible by simultaneously transmitting the same signal using a part or all of antennas within an antenna set consisting of at least two antennas.

An STBC transmission is possible by transmitting an input signal using a space-time coding method using at least two antennas and times if a terminal performs a diversity combination using an STBC method using an antenna set consisting of at least two antennas. In an embodiment, Equation (6) denotes an input signal x for an STBC transmission using a Quasi-orthogonal STBC method using four antennas and time.

$$x = \sqrt{\frac{E_S}{2}} \begin{bmatrix} S_1 & S_2 & S_3 & S_4 \\ -S_2^* & S_1^* & -S_4^* & S_3^* \\ -S_3^* & -S_4^* & S_1^* & S_2^* \\ S_4 & -S_3 & -S_2 & S_1 \end{bmatrix} \quad (6)$$

In this way, a terminal selects antennas necessary for an STBC method using a part or all of antennas included in an antenna set consisting of at least two antennas, and transmits an input signal using a desired STBC method using the selected antennas, so, various types of STBC transmission are possible.

5-4. Multiplexing Combination

A terminal directional multiplexing transmits and/or receives a signal using a space multiplexing method using at least two antennas. Upon directional multiplexing transmitting the signal through the at least two antennas, the terminal transmits the signal using the space multiplexing method by simultaneously transmitting different signals through each antenna. Upon directional multiplexing receiving the signal, the terminal may receive the signal using the space multiplexing method by decoding a signal received through each antenna using a multiplexing reception method such as a Zero-Forcing (ZF), a Minimum Mean Square Error (MMSE), and a Vertical-Bell Laboratories Layered Space-Time (V-BLAST).

Figure 19:
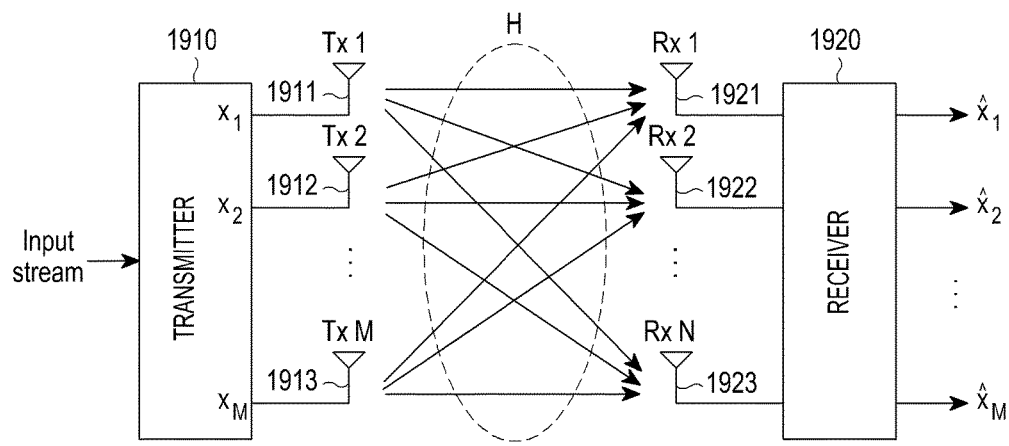
FIG. 19 illustrates an example of a spatial multiplexing transmission/reception method using an antenna set consisting of at least two antennas according to an embodiment of the present invention.

FIG. 19 illustrates an example of a spatial multiplexing transmission/reception method using an antenna set consisting of at least two antennas according to an embodiment of the present invention.

In FIG. 19, each of a transmitter 1910 and a receiver 1920, each equipping with an antenna set consisting of at least two antennas includes at least one antenna set. Each antenna set includes at least one antenna. The transmitter 1910 and the receiver 1920 perform a multiplexing combination using a spatial multiplexing method that a plurality of signals is simultaneously transmitted/received through a Multiple Input Multiple Output (MIMO) channel.

As described in FIG. 19, upon simultaneously transmitting/receiving three independent data streams using a space multiplexing method using an antenna set consisting of three antennas, a transmission device which equips with antenna set generates a combination matrix for each stream expressed as Equation (7) in order to transmit each of three data streams through one antenna by performing a multiplexing combination, and allocated the combination matrix for each stream to each data stream.

$$w = \begin{bmatrix} 1 & 0 & 0 \\ 0 & 1 & 0 \\ 0 & 0 & 1 \end{bmatrix} \text{ or } w = \begin{bmatrix} 0 & 0 & 1 \\ 1 & 0 & 0 \\ 0 & 1 & 0 \end{bmatrix} \quad (7)$$

The transmitter 1910 transmits three independent data streams using a multiplexing combining method through this procedure.

After receiving three independent data streams from the transmitter 1910, the receiver 1920 allocates a combination factor for each stream in order to perform a spatial multiplexing reception through a multiplexing combination. Here, a multiplexing reception method for overcoming interference which occurs among signals due to a MIMO channel should be performed in the receiver 1920. Well-known multiplexing reception method includes a Zero-Forcing (ZF) method, a Minimum Mean Square Error (MMSE) method, a Vertical-Bell Laboratories Layered Space-Time (V-BLAST) method, and the like. If the receiver 1920 uses a ZF method as a typical linear multiplexing reception method, this may be expressed as Equation (8).

$$V^H = (H^H H)^{-1} H^H = \begin{bmatrix} V_{11} & V_{12} & V_{13} \\ V_{21} & V_{22} & V_{23} \\ V_{31} & V_{32} & V_{33} \end{bmatrix}^H = \begin{bmatrix} V_1^H \\ V_2^H \\ V_3^H \end{bmatrix} \quad (8)$$

An intermediate signal vector as expressed in Equation (9) may be acquired by multiplying a pseudo-inverse matrix of a MIMO channel by signals received through an antenna set using a combination matrix for each stream, $$d = V^H x = (H^H H)^{-1} H^H x \quad (9)$$

The receiver 1920 detects three data streams transmitted by the transmitter 1910 by independently determining each element of the intermediated signal vector.

In this way, a transmitter simultaneously transmits different signals through an antenna set on a multiplexing transmission using a part or all of antennas included in an antenna set consisting of at least two antennas, a receiver decodes a received signal using a multiplexing reception method such as a ZF, an MMSE, a V-BLAST, so various types of space multiplexing transmission and/or reception are possible.

5-5. Diversity-Multiplexing Hybrid Combination

A diversity-multiplexing hybrid combining method is a combining method in which a space diversity transmission and a space multiplexing transmission are simultaneously performed if a communication device transmits a signal through at least two antennas.

This diversity-multiplexing hybrid combining method is a method where a communication device transmits a signal using a space diversity combining method or a space multiplexing combining method through a part of at least two antennas and transmits a signal using other space diversity combining method or other space multiplexing combining method through the remaining antenna at the same time. By doing this, the communication device may combine a space diversity transmission and a space multiplexing transmission. In one embodiment, if the communication device equips with four antennas, the communication device transmits a signal using one Alamouti scheme through two antennas, and transmits a signal using another Alamouti scheme through other two antennas as expressed in Equation (10).

$$D = \begin{bmatrix} s_1 & -s_2^* \\ s_2 & s_1^* \\ s_3 & -s_4^* \\ s_4 & s_3^* \end{bmatrix} \quad (10)$$

(Antenna vertical axis; Subcarrier (or time slot) horizontal axis)

In Equation (10), a horizontal axis indicates a sub-carrier or a time slot, and a vertical axis indicates an antenna.

A communication device may combine a space diversity transmission and a space multiplexing transmission by transmitting a signal in which at least two signals are combined using at least two antennas. In one embodiment, if a communication device equips with four antennas, the communication device transmits a signal in which $s_1$ and $s_2$ are combined and a signal in which $s_2$ and $s_3$ are combined through two antennas as expressed in Equation (11), so a space diversity transmission and a space multiplexing transmission are simultaneously performed.

$$E = \frac{1}{\sqrt{1+r^2}} \begin{bmatrix} s_1 + jr \cdot s_4 & r \cdot s_2 + s_3 \\ s_2 - r \cdot s_3 & jr \cdot s_1 + s_4 \end{bmatrix}, r = \frac{-1+\sqrt{5}}{2} \quad (11)$$

The diversity-multiplexing hybrid combining method includes Double Alamouti, Stacked Alamouti, Double ABBA, Diagonal ABBA, Quasi-Orthogonal STBC (QOSTBC), a Threaded Algebraic Space-Time (TAST) code, a Golden code, a Heath code, a Generalized optimal diversity (GOD) code, and the like.

5-6. Cyclic Delay Diversity (CDD) Combination

Figure 20:
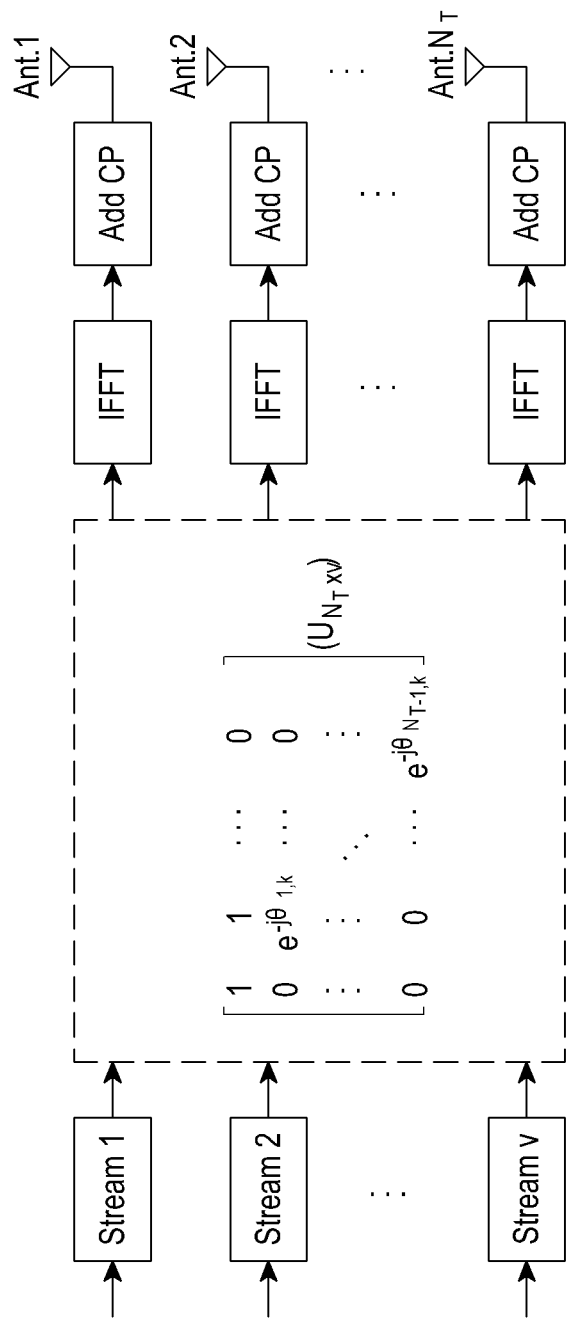
FIG. 20 illustrates a CDD combining method of a communication device in an OFDM system according to an embodiment of the present invention.

The CDD combination is a method in which a communication device transmits a signal in order to acquire a diversity gain by allocating a cyclic delay to the signal and increasing a frequency selective characteristic upon transmitting the signal using at least two antennas. Hereinafter, embodiments for the CDD combination will be described.

transmission block diagram of a communication device for transmitting a signal using a CDD combining method in an OFDM system:

FIG. 20 illustrates a. CDD combining method of a communication device in an OFDM system according to an embodiment of the present invention.

As illustrated in FIG. 20, upon simultaneously transmitting v signals, a communication device which equips with $N_T$ antennas transmits the v signals by allocating a cyclic delay value $\theta_{i,k}$ (i=1, ..., $N_T$-1, k=0, 1, ..., M-1) which is different for each antenna. Here, $U_{N_T \times v}$ denotes a $N_T \times v$ unitary matrix, $\theta_{i,k}$ (i=1, ..., $N_T$-1, k=0, 1, ..., M-1) denotes a cyclic delay value for each antenna, and M denotes the number of modulation symbols forming one codeword. If a communication device transmits v signals which are identical one another, a CDD combining method is a CDD combining method combined with space diversity transmission, and if the communication device transmits v signals which are different one another, the CDD combining method is a CDD combining method combined with space multiplexing transmission.

transmission block diagram of a communication device for transmitting a signal using a CDD transmission mode using a pre-coding in an OFDM system:

Upon transmitting at least two signals using at least two antennas, a communication device may perform a CDD combining method in which the communication device allocates different cyclic delay values to different directional beams which are formed by independent pre-coding vectors, respectively by allocating a weight for each antenna to each antenna and using a pre-coding vector which is formed a directional beam.

Figure 21:
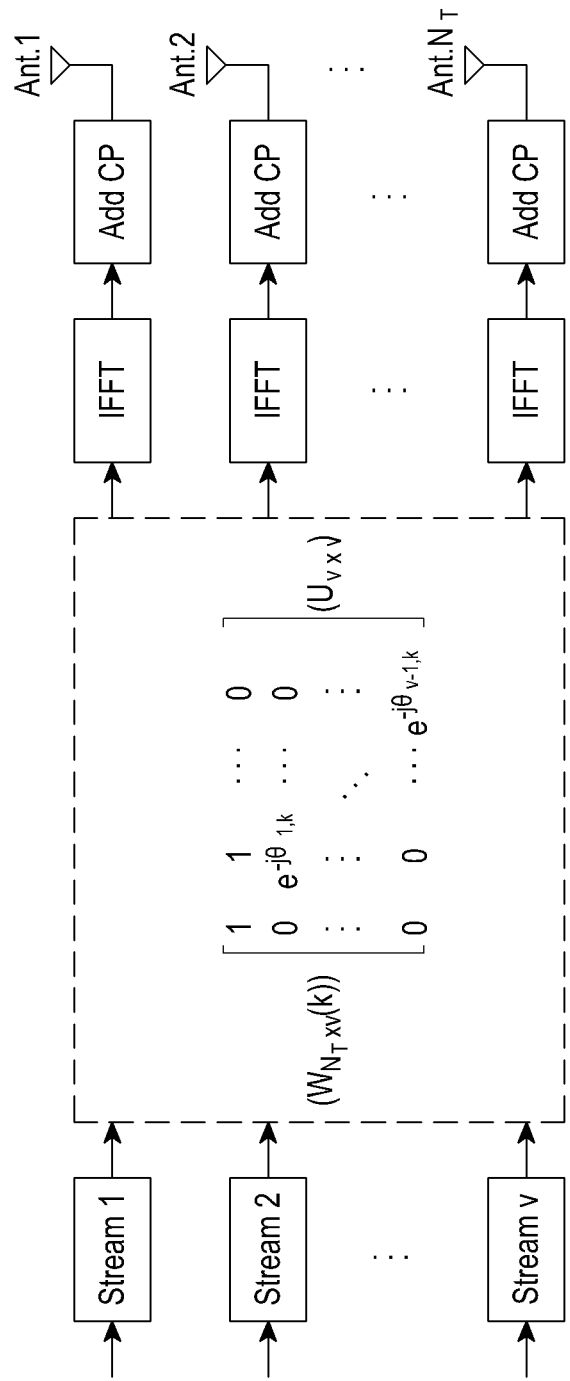
FIG. 21 illustrates a CDD transmission block diagram using a pre-coding in an OFDM system according to an embodiment of the present invention.

FIG. 21 illustrates a CDD transmission block diagram using a pre-coding in an OFDM system according to an embodiment of the present invention.

As described in FIG. 21, upon simultaneously transmitting v signals, a communication device which equips with $N_T$ antennas allocates a different cyclic delay value $\theta_{i,k}$ to each directional beam. Here, $w_{N_T \times v}(k)$ is a $N_T \times v$ pre-coding matrix of a kth modulation symbol. In one embodiment, if a communication device equips with two antennas and transmits signals, the communication device transmits the signals by not allocating a cyclic delay value to a first directional beam which is formed through a pre-coding vector $[1\ 1]^T$ and allocating a cyclic delay value $2\pi k/2$ to a second directional beam which is formed through a pre-coding vector $[1\ -1]^T$, $$W(k)D(k)U\begin{bmatrix} s_1 \\ s_2 \end{bmatrix} = \frac{1}{2\sqrt{2}} \begin{bmatrix} 1 & 1 \\ 1 & -1 \end{bmatrix} \begin{bmatrix} 1 & 0 \\ 0 & e^{-j2\pi k/2} \end{bmatrix} \begin{bmatrix} 1 & 1 \\ 1 & e^{-j2\pi/2} \end{bmatrix} \begin{bmatrix} s_1 \\ s_2 \end{bmatrix} \quad (12)$$

In Equation (12), k denotes an index of a modulation symbol, W(k) is a pre-coding matrix of the kth modulation symbol, D(k) is a CDD matrix of the kth modulation symbol, and U is a unitary matrix. $\frac{1}{2}\sqrt{2}$ denotes a constant for a transmission power normalization.

5-7. Multi-User Combination

The multi-user combining method is a method in which a base station acquires a space multiple division gain by simultaneously transmitting independent signals for at least two terminals using at least two transmit antennas or at least two directional beams. Hereinafter, embodiments for a multi-user combining method will be described.

Figure 22:
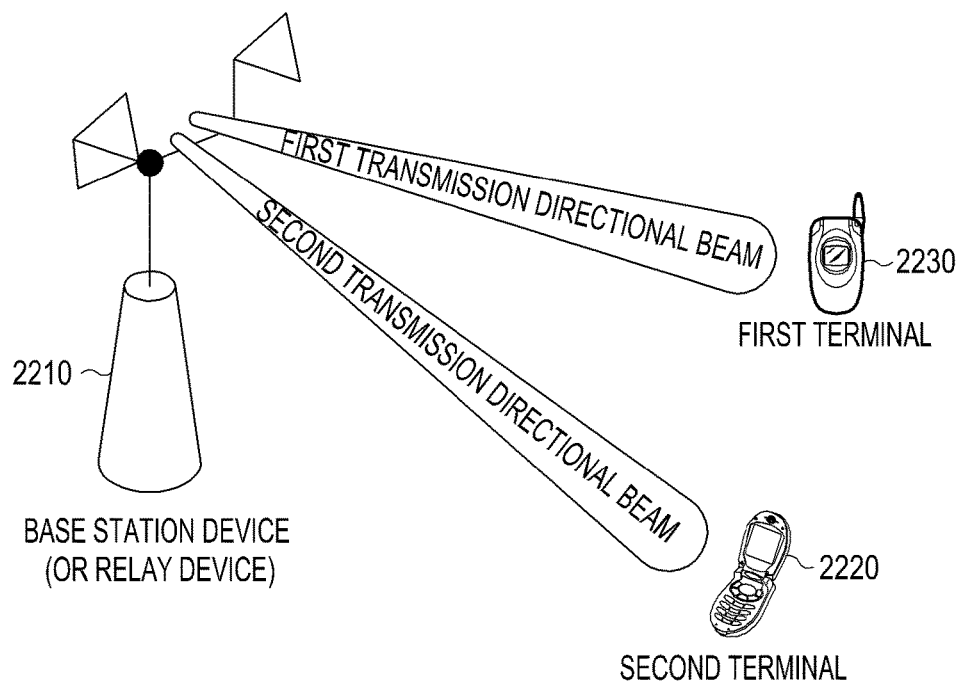
FIG. 22 illustrates an example of a multi-user combining method according to an embodiment of the present invention.

FIG. 22 illustrates an example of a multi-user combining method according to an embodiment of the present invention.

As described in FIG. 22, upon simultaneously transmitting independent signals to two terminals 2220, 2230 by equipping with two antennas, a base station (or a relay device) 2210 simultaneously transmits a signal of each terminal using different directional beams which are formed by independent precoding vectors using a multi-user MIMO precoding vector. The base station 2210 transmits a signal of a first terminal 2220 through a first transmission directional beam and transmits a signal of a second terminal 2230 through a second transmission directional beam.

In this way, the antenna combining method determination unit 260 of the terminal determines an antenna combining method of each of antenna sets for each cooperative transmission communication device.

In order to determine an antenna combining method, a terminal considers a channel condition, a connection state, a RAT preference, a service price, a neighbor list order, a required bandwidth condition, a required transmission rate condition, a required error rate condition, an access condition, a distance between a cooperative transmission communication device and the terminal, loading rate of the cooperative transmission communication device, and the like.

Hereinafter, an embodiment of a cooperative transmission method according to an embodiment of the present invention will be followed.

For a detailed description, it is considered that a reference communication device is a terminal, a cooperative transmission communication device is a base station, and a resource for a connection among communication devices is a frequency. For example, a terminal (reference communication device) which equips with two or three antennas is explained, however, it will be understood by those of ordinary skill in the art that this is applicable to all of terminals which equip with at least one antenna. In the next embodiment, for a detailed description, a system in which a terminal which equips with two antennas communicates with two base stations is explained by considering a cellular system, however, it will be understood by those of ordinary skill in the art that this is applicable to various radio communication environments such as a WMAN, a WLAN, and an ad-hoc as well as the cellular system, and this is applicable for establishing a connection to base stations consisting of different RATS in an environment that there are various RATS.

1. embodiment #1: method for cooperatively transmitting from/to two base stations using one antenna.

Figure 23:
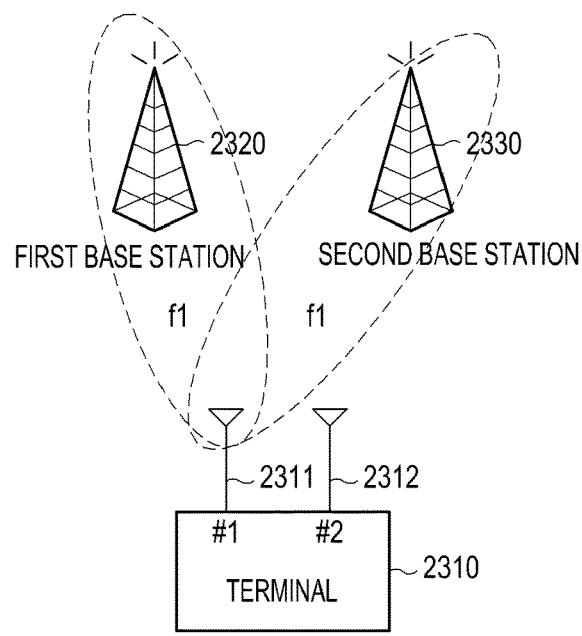
FIG. 23 illustrates an example of cooperative transmission from/to two base stations using one antenna according to an embodiment of the present invention.

FIG. 23 illustrates an example of cooperative transmission from/to two base stations using one antenna according to an embodiment of the present invention.

As described in FIG. 23, upon cooperatively transmitting from/to a first base station 2320 and a second base station 2330 using a first antenna 2311, a terminal 2310 performs cooperative transmission from/to the first base station 2320 and the second base station 2330 using a first frequency (f1) by determining a cooperative transmission mode as a same information-single session-same resource-same transmission scheme cooperative transmission mode, and determining a cooperative transmission mode-transmission-targeting communication device set as a first base station 2320.

In this way, the terminal 2310 performs cooperative transmission from/to at least two cooperative transmission communication devices by determining a cooperative transmission mode and a cooperative transmission mode-transmission-targeting communication device and using the determined cooperative transmission mode. This scheme is applicable to a case that the terminal 2310 performs cooperative transmission from/to base stations with different RATs.

Upon cooperatively transmitting from/to the first base station 2320 and the second base station 2330 using the first antenna 2311, the terminal 2310 determines a same information-single session-same resource-same transmission scheme cooperative transmission mode as a cooperative transmission mode. The terminal 2310 uses commonly an antenna set consisting of the first antenna and performs cooperative transmission from/to the first base station and the second base station using a first frequency) by determining a cooperative transmission mode-transmission-targeting communication device set as the first base station 2320, determining a cooperative transmission communication device set as the first base station 2320, and determining an antenna set of the first base station as an antenna set consisting of the first antenna and an antenna set of the second base station as an antenna set consisting of the first antenna.

In this way, the terminal 2310 performs cooperative transmission from/to at least two cooperative transmission communication devices in order to use commonly one antenna with each cooperative transmission communication device by determining a cooperative transmission mode, a cooperative transmission mode-transmission-targeting communication device set, a cooperative transmission communication device set, an antenna set for each cooperative transmission communication device set, and a common use type of each of antenna sets for each cooperative transmission communication device. This scheme is applicable to a case that the terminal 2310 performs cooperative transmission from/to base stations with different RATs.

2. embodiment #2: method for establishing a connection to two base stations using two antennas.

Figure 24:
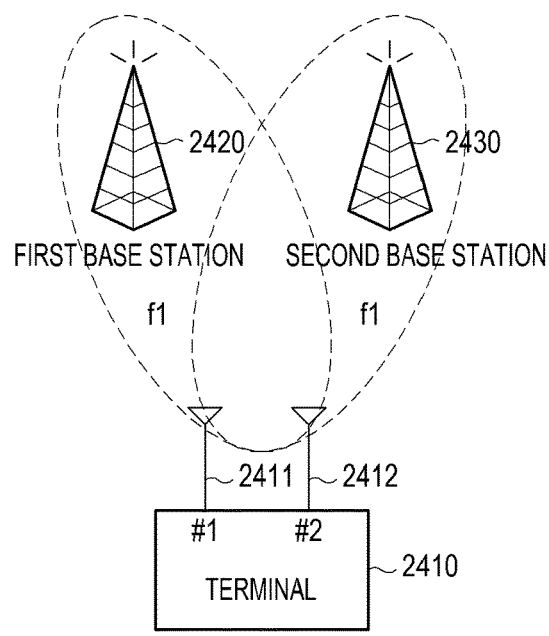
FIG. 24 illustrates an example of cooperative transmission from/to two base stations using the same resource by using commonly two antennas according to an embodiment of the present invention.

The embodiment #2 includes four embodiments such as FIG. 24, FIG. 25, FIG. 26, and FIG. 27.

embodiment #1: example for cooperatively transmitting from/to two base stations using the same resource by using commonly two antennas (FIG. 24):

FIG. 24 illustrates an example of cooperatively transmitting from/to two base stations using the same resource by using commonly two antennas according to an embodiment of the present invention.

As described in FIG. 24, a terminal 2410 performs cooperative transmission from/to a first base station and a second base station using two antennas. For such cooperative transmission, the terminal 2410 determines a cooperative transmission mode as a same information-single session-same resource-different transmission scheme-cooperative transmission mode. The terminal 2410 performs cooperative transmission from/to a first base station and a second base station using a first frequency (f1) by determining a cooperative transmission mode-transmission-targeting communication device set as the first base station 2420, and determining a cooperative transmission communication device set as the first base station 2420 and a second base station 2430.

In this way, the terminal 2410 determines a cooperative transmission mode, a cooperative transmission mode-transmission-targeting communication device set, a cooperative transmission communication device set, so the terminal 2410 performs cooperative transmission from/to at least two cooperative transmission communication devices using the determined cooperative transmission mode. This scheme is applicable to a case that the terminal 2410 performs cooperative transmission from/to base stations with different RATs.

The terminal determines the first base station as a cooperative transmission mode-transmission-targeting communication device set, the first base station and the second base station as a cooperative transmission communication device set, an antenna set consisting of a first antenna and a second antenna as an antenna set of the first base station, an antenna set consisting of the first antenna and the second antenna as an antenna set of the second base station, and an antenna combining method of an antenna set consisting of the first antenna and the second antenna, so the terminal uses commonly the antenna set consisting of the first antenna and the second antenna, and performs cooperative transmission from/to the first base station and the second base station using a first frequency (f1) through determined antenna combining method.

An antenna set consisting of at least two antennas may operate using an antenna combining method of one of an omnidirectional combining, a directional combining, a diversity combining, a multiplex combining, a diversity-multiplexing hybrid combining, a CDD combining, and a multi-user combining. Here, the antenna set may operate as various antenna sets according to a directional beam pattern and a signal transmission/reception method for each antenna set.

Figure 25:
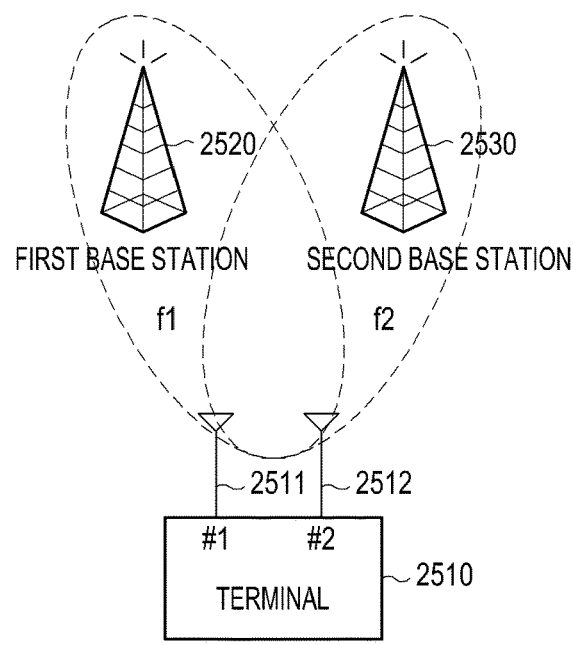
FIG. 25 illustrates an example of cooperative transmission from/to two base stations using different resources by using commonly two antennas according to an embodiment of the present invention.

In this way, a terminal determines a cooperative transmission mode, a cooperative transmission mode-transmission-targeting communication device set, a cooperative transmission communication device set, an antenna set for each cooperative transmission communication device set, a common use type of each of antenna sets for each cooperative transmission communication device, and an antenna combining method of each of antenna sets for each cooperative transmission communication device. The terminal performs cooperative transmission from/to at least two cooperative transmission communication devices in order that each of cooperative transmission communication devices uses commonly at least one antenna in included in antenna sets for each cooperative transmission communication device. This scheme is applicable to a case that the terminal performs cooperative transmission from/to base stations with different RATs.

embodiment #2: example for cooperatively transmitting from/to two base stations using different resources by using commonly two antennas (FIG. 25):

FIG. 25 illustrates an example of cooperatively transmitting from/to two base stations using different resources by using commonly two antennas according to an embodiment of the present invention.

As described in FIG. 25, a terminal 2510 performs cooperative transmission from/to a first base station 2520 and a second base station 2530 using two antennas 2511, 2512 and different resources. For such cooperative transmission, the terminal 2510 determines a cooperative transmission mode as a same information, single session, different resource, different transmission scheme cooperative transmission mode, determines a cooperative transmission mode-transmission-targeting communication device set as a first base station 2520, determines an antenna set of a first base station 2520 as an antenna set consisting of a first antenna and a second antenna, and determines an antenna set of a second base station 2530 as an antenna set consisting of the first antenna and the second antenna. The terminal 2510 performs cooperative transmission from/to a first base station 2520 using a first frequency (f1) and performs cooperative transmission from/to a second base station 2530 using a second frequency (f2) through an antenna combining method which is determined by using commonly an antenna set consisting of a first antenna and a second antenna.

An antenna set consisting of at least two antennas may operate using an antenna combining method of one of an omni-directional combining, a directional combining, a diversity combining, a multiplex combining, a diversity-multiplex hybrid combining, a CDD combining, and a multi user combining. Here, the antenna set may operate as various antenna sets according to a directional beam pattern and a signal transmission/reception method for each antenna set.

Figure 26:
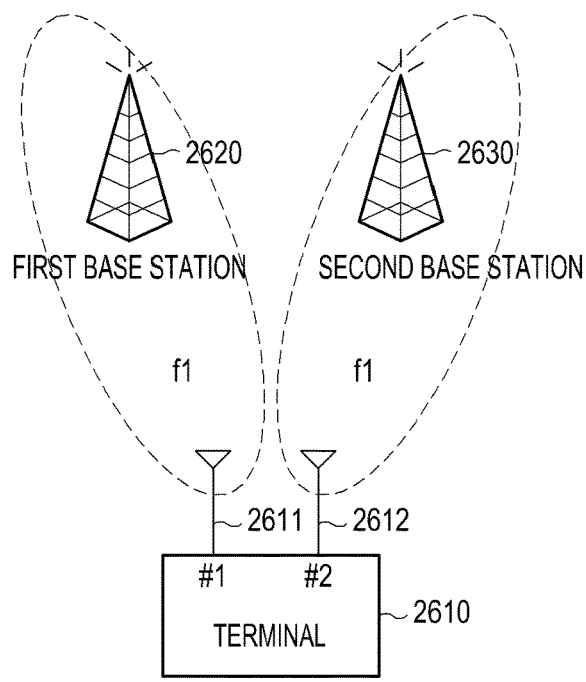
FIG. 26 illustrates an example of cooperative transmission from/to two base stations using the same resource and two antennas through multiple sessions according to an embodiment of the present invention.

In this way, the terminal 2510 determines a cooperative transmission mode, a cooperative transmission mode-transmission-targeting communication device set, and an antenna set for each cooperative transmission communication device. The terminal 2510 performs cooperative transmission from/to at least two cooperative transmission communication devices using the determined cooperative transmission mode. This scheme is applicable to a case that the terminal 2510 performs cooperative transmission from/to base stations with different RATs.

embodiment #3: example for cooperatively transmitting from/to two base stations using the same resource and two antennas through multiple sessions (FIG. 26):

FIG. 26 illustrates an example of cooperatively transmitting from/to two base stations using the same resource and two antennas through multiple sessions according to an embodiment of the present invention.

As illustrated in FIG. 26, a terminal 2610 performs cooperative transmission from/to a first base station and a second base station using two antennas 2611, 2612. In such cooperative transmission, the terminal 2610 determines a cooperative transmission mode as a same information-multi-session-same resource-same transmission scheme cooperative transmission mode. The terminal 2610 determines a cooperative transmission mode-transmission-targeting communication device set as a first base station, and determines a cooperative transmission communication device set as the first base station and a second base station. The terminal 2610 determines an antenna set of the first base station as an antenna set consisting of a first antenna and determines an antenna set of the second base station as an antenna set consisting of a second antenna. And, a terminal performs cooperative transmission from/to the first base station through a first frequency (f1) using an antenna set consisting of the first antenna and performs cooperative transmission from/to the second base station through a first frequency (f1) using an antenna set consisting of the second antenna.

Figure 27:
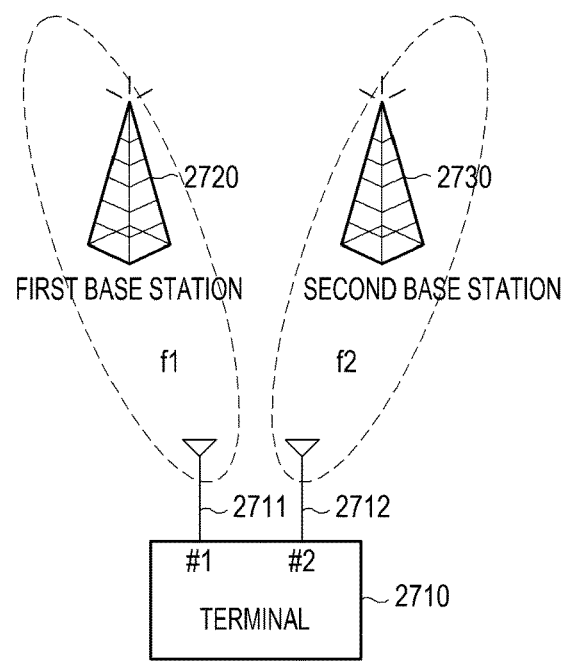
FIG. 27 illustrates an example of cooperative transmission from/to two base stations using different resources and two antennas through multiple sessions according to an embodiment of the present invention.

In this way, the terminal 2610 performs cooperative transmission from/to at least two cooperative transmission communication devices in order that each of cooperative transmission communication devices uses antenna sets for each cooperative transmission communication device consisting of at least one antenna, each being different one another by determining a cooperative transmission mode, a cooperative transmission mode-transmission-targeting communication device set, a cooperative transmission communication device set, an antenna set for each cooperative transmission communication device set, and a common use type of each of antenna sets for each cooperative transmission communication device. This scheme is applicable to a case that the terminal 2610 performs cooperative transmission from/to base stations with different RATs.

embodiment #4: example for cooperatively transmitting from/to two base stations using different resources and two antennas through multiple sessions (FIG. 27):

FIG. 27 illustrates an example of cooperatively transmitting from/to two base stations using different resources and two antennas through multiple sessions according to an embodiment of the present invention.

As illustrated in FIG. 27, a terminal 2710 determines a cooperative transmission mode as a different information, multi session, different resource, different transmission scheme cooperative transmission mode upon cooperatively transmitting from/to a first base station 2720 and a second base station 2730 using two antennas. The terminal 2710 determines a cooperative transmission mode-transmission-targeting communication device set as a second base station, determines a cooperative transmission communication device set as a first base station and the second base station, determines an antenna set of the first base station as an antenna set consisting of a first antenna, and determines an antenna set of the second base station as an antenna set consisting of a second antenna. So, the terminal 2710 performs cooperative transmission from/to the first base station 2720 through a first frequency (f1) using an antenna set consisting of the first antenna and performs cooperative transmission from/to the second base station 2730 through a second frequency 42) using an antenna set consisting of the second antenna.

In this way, the terminal 2710 determines a cooperative transmission mode, a cooperative transmission mode-transmission-targeting communication device set, a cooperative transmission communication device set, an antenna set for each cooperative transmission communication device, and a common use type of each of antenna sets for each cooperative transmission communication device. By doing this, the terminal 2710 performs cooperative transmission from/to at least two cooperative transmission communication devices in order that each cooperative transmission communication device uses antenna sets for each cooperative transmission communication device consisting of at least one different antenna. This scheme is applicable to a case that the terminal 2710 performs cooperative transmission from/to base stations with different RATs.

3. embodiment #3: method for establishing a connection to two base stations using three antennas in order to use commonly a part of antennas included in an antenna set.

Figure 28:
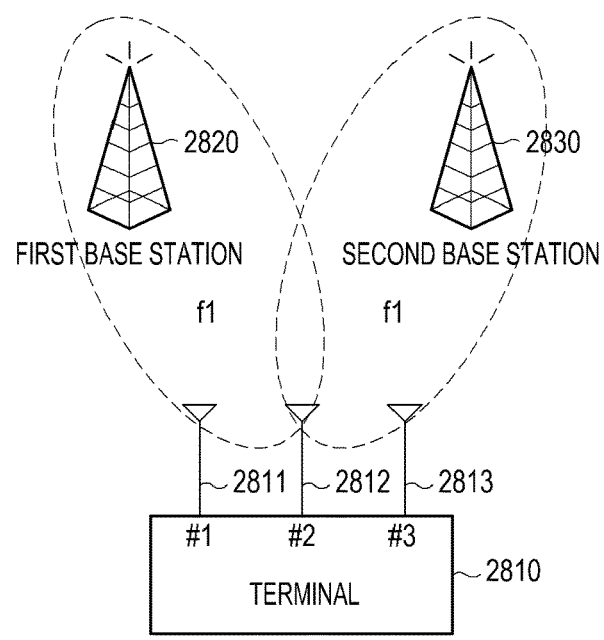
FIG. 28 illustrates an example of cooperative transmission from/to two base stations by using commonly a part of antennas included in an antenna set according to an embodiment of the present invention.

FIG. 28 illustrates an example of cooperatively transmitting from/to two base stations by using commonly a part of antennas included in an antenna set according to an embodiment of the present invention.

As illustrated in FIG. 28, a terminal 2810 performs cooperative transmission from/to a first base station and a second base station using three antennas 2811, 2812, 2813. For cooperative transmission, the terminal 2810 determines a cooperative transmission mode as a different information-multi-session-same resource-different transmission scheme cooperative transmission mode. The terminal 2810 determines a cooperative transmission mode-transmission-targeting communication device set as a first base station, determines a cooperative transmission communication device set as the first base station and a second base station, determines an antenna set of the first base station as an antenna set consisting of a first antenna and a second antenna, and determines an antenna set of the second base station as an antenna set consisting of the second antenna and a third antenna. A terminal performs cooperative transmission from/to the first base station and the second base station using a first frequency (f1) through an antenna combining method which is determined using each of an antenna set consisting of the first antenna and the second antenna and an antenna set consisting of the second antenna and the third antenna by determining an antenna combining method consisting of the first antenna and the second antenna and determining an antenna combining method consisting of the second antenna and the third antenna.

An antenna set consisting of at least two antennas may operate using an antenna combining method of one of an omnidirectional combining, a directional combining, a diversity combining, a multiplexing combining, a diversity-multiplexing hybrid combining, a CDD combining, and a multi-user combining. Here, the antenna set may operate as various antenna sets according to a directional beam pattern and a signal transmission/reception method for each antenna set.

In this way, the terminal 2810 determines a cooperative transmission mode, a cooperative transmission mode-transmission-targeting communication device set, a cooperative transmission communication device set, an antenna set for each cooperative transmission communication device, a common use type of each of antenna sets for each cooperative transmission communication device, and an antenna combining method of each of the antenna sets for each cooperative transmission communication device. By doing this, the terminal 2810 performs cooperative transmission from/to at least two cooperative transmission communication devices in order that each cooperative transmission communication device uses commonly a part or all of antennas included in each antenna set for each cooperative transmission communication device. This scheme is applicable to a case that the terminal 2810 performs cooperative transmission from/to base stations with different RATs.

An embodiment in which a RAT is the same has been described above, and an embodiment in which RATs are different will be described below.

Figure 29:
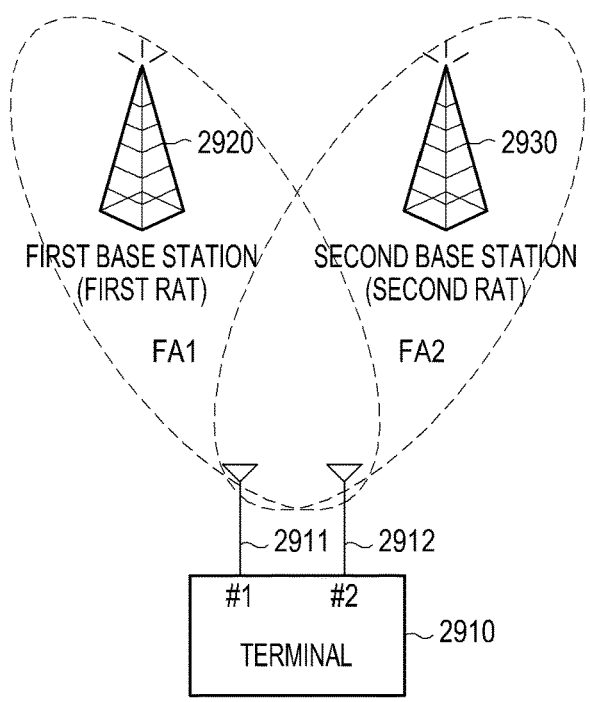
FIG. 29 illustrates an example of cooperative transmission from/to two base stations consisting of different RATs by using commonly two antennas according to an embodiment of the present invention.

4. embodiment #4: method for establishing a connection to two base stations of which RATs are different.

embodiment #1: embodiment in which a terminal performs cooperative transmission from/to two base stations consisting of different RATs by using commonly two antennas (FIG. 29):

FIG. 29 illustrates an example of cooperatively transmitting from/to two base stations consisting of different RATs by using commonly two antennas according to an embodiment of the present invention.

As described in FIG. 29, a terminal 2910 performs cooperative transmission from/to a first base station 2920 and a second base station 2930 which use different RATs using two antennas. In such cooperative transmission, the terminal 2910 determines a cooperative transmission mode as a same information-multi-session-different resource-different transmission scheme cooperative transmission mode. The terminal 2910 determines a cooperative transmission mode-transmission-targeting communication device set as a first base station 2920, determines a cooperative transmission communication device set as the first base station 2920 consisting of a first RAT and a second base station 2930 consisting of a second RAT, determines an antenna set of the first base station as an antenna set consisting of a first antenna 2911 and a second antenna 2912, and determines an antenna set of the second base station as an antenna set consisting of the first antenna 2911 and the second antenna 2912. A terminal performs cooperative transmission from/to the first base station 2920 through a first frequency band (FA1) and from/to the second base station 2930 through a second frequency band (FA2) using an antenna set consisting of the first antenna and the second antenna by determining an antenna combining method consisting of the first antenna and the second antenna.

An antenna set consisting of at least two antennas may operate using an antenna combining method of one of an omnidirectional combining, a directional combining, a diversity combining, a multiplex combining, a diversity-multiplex hybrid combining, a CDD combining, and a multi user combining. Here, the antenna set may operate as various antenna sets according to a directional beam pattern and a signal transmission/reception method for each antenna set.

Figure 30:
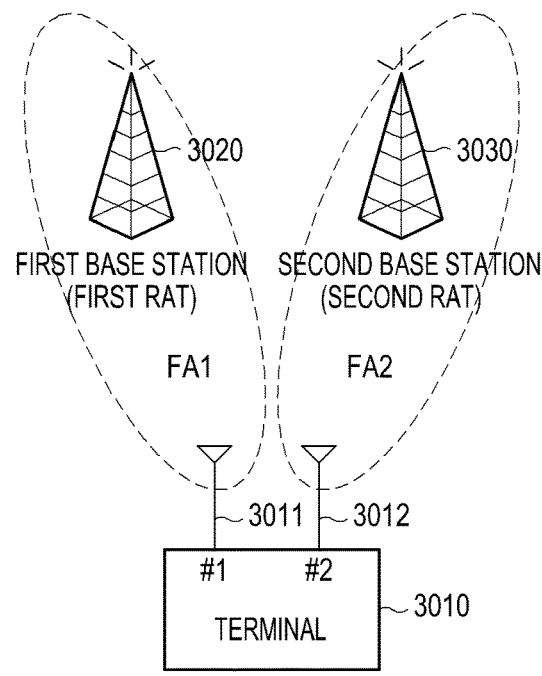
FIG. 30 illustrates an example of cooperative transmission from/to two base stations consisting of different RATs using two antennas according to an embodiment of the present invention.

In this way, the terminal 2910 determines a cooperative transmission mode, a cooperative transmission mode-transmission-targeting communication device set, a cooperative transmission communication device set, an antenna set for each cooperative transmission communication device, a common use type of each of antenna sets for each cooperative transmission communication device, and an antenna combining method of each of the antenna sets for each cooperative transmission communication device. By doing this, the terminal 2910 performs cooperative transmission from/to at least two cooperative transmission communication devices in order that each cooperative transmission communication device uses commonly at least one antenna included in each antenna set, and RATs of a part or all of cooperative transmission communication devices included in a cooperative transmission communication device set are different one another.

embodiment #2: embodiment in which a terminal performs cooperative transmission from/to two base stations consisting of different RATs using two antennas (FIG. 30):

FIG. 30 illustrates an example of cooperatively transmitting from/to two base stations consisting of different RATs using two antennas according to an embodiment of the present invention.

A terminal 3010 performs cooperative transmission from/to a first base station 3020 and a second base station 3030 of which RATs are different using two antennas. In such cooperative transmission, the terminal 3010 determines a cooperative transmission mode as a different information-multi-session-different resource-different transmission scheme cooperative transmission mode. The terminal 3010 determines a cooperative transmission mode-transmission-targeting communication device set as a first base station, determines a cooperative transmission communication device set as a first base station 3020 consisting of a first RAT and a second base station 3030 consisting of a second. RAT, determines an antenna set of the first base station as an antenna set consisting of a first antenna 3011, and determines an antenna set of the second base station as an antenna set consisting of the second antenna 3012. By doing this, the terminal 3010 performs cooperative transmission from/to the first base station 3020 through a first frequency band (FA1) using an antenna set consisting of the first antenna 3011, and performs cooperative transmission from/to the second base station 3030 through a second frequency band (FA2) using an antenna set consisting of the second antenna 3012.

An antenna set consisting of at least two antennas may operate in an antenna combining method of one of an omnidirectional combining, a directional combining, a diversity combining, a multiplexing combining, a diversity-multiplexing hybrid combining, a CDD combining, and a multi-user combining. Here, the antenna set may operate as various antenna sets according to a directional beam pattern and a signal transmission/reception method for each antenna set.

Figure 31:
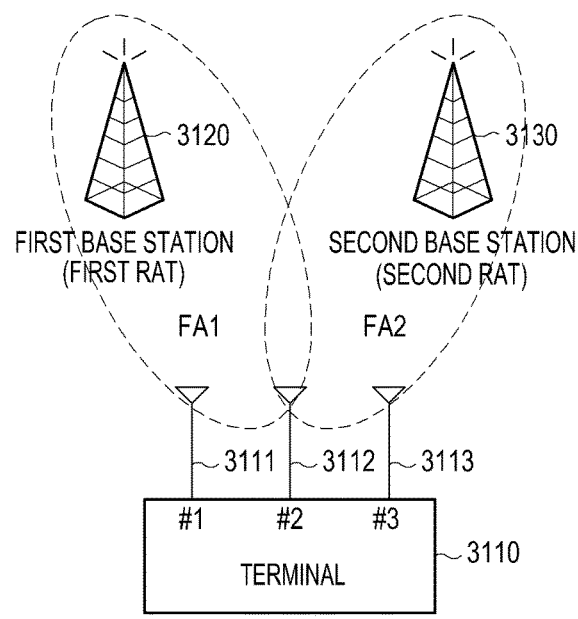
FIG. 31 illustrates an example of cooperative transmission from/to two base stations consisting of different RATs by using commonly a part of antennas included in two antenna sets according to an embodiment of the present invention.

In this way, the terminal 3010 determines a cooperative transmission mode, a cooperative transmission mode-transmission-targeting communication device set, a cooperative transmission communication device set, an antenna set for each cooperative transmission communication device, a common use type of each of antenna sets for each cooperative transmission communication device, and an antenna combining method of each of the antenna sets for each cooperative transmission communication device. By doing this, the terminal 3010 performs cooperative transmission from/to at least two cooperative transmission communication devices in order that each cooperative transmission communication device uses antenna sets for each cooperative transmission communication device set consisting of at least one different antenna and RATs of a part or all of cooperative transmission communication devices included in a cooperative transmission communication device set are different one another.

embodiment #3: embodiment in which a terminal performs cooperative transmission from/to two base stations consisting of different RATs by using commonly a part of antennas included in two antenna sets (FIG. 31):

FIG. 31 illustrates an example of cooperatively transmitting from/to two base stations consisting of different RATs by using commonly a part of antennas included in two antenna sets according to an embodiment of the present invention.

As described in FIG. 31, a terminal 3110 performs cooperative transmission from/to a first base station 3120 and a second base station 3130 which use different RATs using three antennas. In such cooperative transmission, the terminal 3110 determines a cooperative transmission mode as a same information-multi-session-different resource-different transmission scheme cooperative transmission mode. The terminal 3110 determines a cooperative transmission mode-transmission-targeting communication device set as a first base station, and determines a cooperative transmission communication device set as a first base station 3120 consisting of a first RAT and a second base station 3130 consisting of a second RAT. The terminal 3110 determines an antenna set of the first base station as an antenna set consisting of a first antenna 3011 and a second antenna 3112, determines an antenna set of the second base station as an antenna set consisting of the second antenna 3112 and a third antenna 3113, determines an antenna combining method of an antenna set consisting of a first antenna and a second antenna, and determines an antenna combining method of an antenna set consisting of the second antenna and a third antenna. The terminal 3110 performs cooperative transmission from/to the first base station 3120 through a first frequency band (FA1) using an antenna set consisting of a first antenna and a second antenna, and performs cooperative transmission from/to the second base station 3130 through a second frequency band (FA2) using an antenna set consisting of the second antenna and a third antenna.

An antenna set consisting of at least two antennas may operate in an antenna combining method of one of an omnidirectional combining, a directional combining, a diversity combining, a multiplexing combining, a diversity-multiplexing hybrid combining, a CDD combining, and a multi-user combining. Here, the antenna set may operate as various antenna sets according to a directional beam pattern and a signal transmission/reception method for each antenna set.

In this way, the terminal 3110 determines a cooperative transmission mode, a cooperative transmission mode-transmission-targeting communication device set, a cooperative transmission communication device set, an antenna set for each cooperative transmission communication device, a common use type of each of antenna sets for each cooperative transmission communication device, and an antenna combining method of each of the antenna sets for each cooperative transmission communication device. By doing this, the terminal 3110 performs cooperative transmission from/to at least two cooperative transmission communication devices in order that each cooperative transmission communication device uses commonly at least one antenna forming each antenna set for each cooperative transmission communication device and RATs of a part or all of cooperative transmission communication devices forming a cooperative transmission communication device set are different one another.

Hereinafter, an embodiment of a cooperative transmission changing method according to an embodiment of the present invention will be described.

Hereinafter, for detailed description, it will be considered that a reference communication device is a terminal, a cooperative transmission communication device is a base station, and a resource for connecting among communication devices is a frequency. In an embodiment, the reference communication device is a terminal which equips with two antennas, however, it will be understood by those of ordinary skill in the art that the reference communication device is applicable to a terminal which equips with at least one antenna. In another embodiment, for detailed description, a system is a system where a terminal which equips with two antennas communicates with two base stations by considering a cellular system, however, it will be understood by those of ordinary skill in the art that the system is determined by considering various radio communication environments such as a WMAN, a WLAN, and an ad-hoc, and an environment where various RATs are existed and a terminal changes a cooperative transmission mode where the terminal performs cooperative transmission from/to base stations consisting of different RATs as well as the cellular system.

1. embodiment #1: a case that a cooperative transmission mode is changed.

Figure 32:
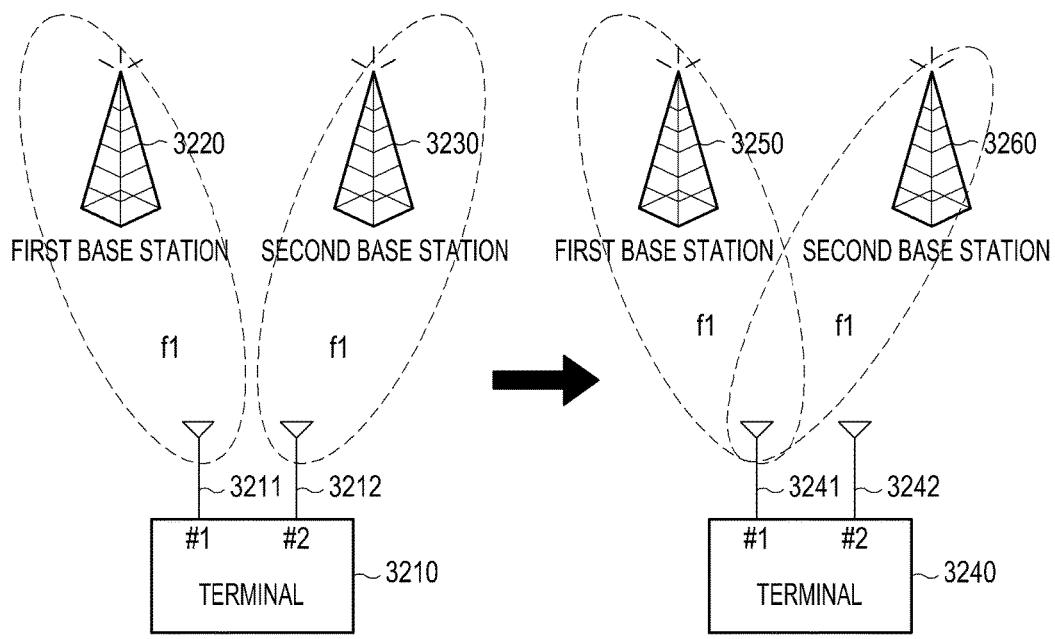
FIG. 32 illustrates an example of changing a cooperative transmission mode according to an embodiment of the present invention.

FIG. 32 illustrates an example of changing a cooperative transmission mode according to an embodiment of the present invention.

As illustrated in FIG. 32, a cooperative transmission method is changed from a first terminal 3210 which performs cooperative transmission from/to a first base station 3220 and a second base station 3230 using two antennas to a second terminal 3240 which performs cooperative transmission from/to a third base station 3250 and a fourth base station 3260. The first terminal 3210 is identical to the second terminal 3240. Further, the first base station 3220 is identical to the third base station 3250, and the second base station 3230 is identical to the fourth base station 3260.

Upon changing such cooperative transmission, a transmission mode determination unit 210 changes a cooperative transmission mode from a same information-multi-session-same resource-different transmission scheme-cooperative transmission mode to the resting cooperative transmission mode except for the same information-multi-session-same resource-different transmission scheme-cooperative transmission mode. A terminal performs cooperative transmission from/to a first base station and a second base station using a first antenna and a first frequency (f1) by determining a cooperative transmission mode-transmission-targeting communication device set as the first base station 3220.

That is, as illustrated in FIG. 32, a first antenna 3211 of the terminal 3210 performs cooperative transmission from/to the first base station 3220 using the first frequency (f1), and a second antenna 3212 of the terminal 3210 performs cooperative transmission from/to the second base station 3230 using the first frequency (f1). A change of the cooperative transmission mode is a change from a left mode to a right mode, changes a cooperative transmission mode to the first base station 3250 and the second base station 3260 using the first antenna 3241 and the first frequency.

In this way, the terminal 3210 performs cooperative transmission from/to at least two cooperative transmission communication devices in order to change a cooperative transmission mode to a cooperative transmission mode except for a current cooperative transmission mode by changing the cooperative transmission mode and determining a cooperative transmission mode-transmission-targeting communication device set. This scheme is applicable to a case that the terminal 3210 changes a cooperative transmission mode where the terminal performs cooperative transmission from/to base stations with different RATs.

2. embodiment #2: a case that a cooperative transmission mode and a cooperative transmission communication device set are changed.

Figure 33:
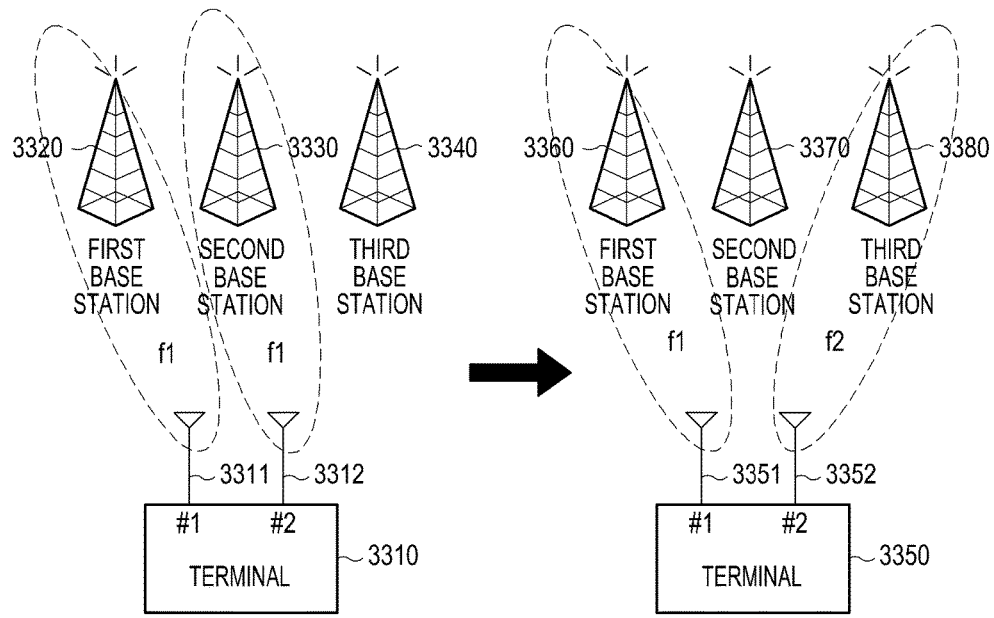
FIG. 33 illustrates an example of changing a cooperative transmission mode and a cooperative transmission communication device set according to an embodiment of the present invention.

FIG. 33 illustrates an example of changing a cooperative transmission mode and a cooperative transmission communication device set according to an embodiment of the present invention.

As illustrated in FIG. 33, a cooperative transmission method is changed from a first terminal 3310 which performs cooperative transmission from/to a first base station 3320 and a second base station 3330 using two antennas to a second terminal 3350 which performs cooperative transmission from/to a fourth base station 3360 and a sixth base station 3380. The first terminal 3310 is identical to the second terminal 3350. Further, the first base station 3320 is identical to the fourth base station 3360, and the third base station 3340 is identical to the sixth base station 3380. Like this, a state of the first terminal 3310 is changed to a state of the second terminal 3350.

Upon changing such cooperative transmission, a terminal changes a cooperative transmission mode from a same information-multi-session-same resource-different transmission scheme-cooperative transmission mode to the resting cooperative transmission mode except for the same information-multi-session-same resource-different transmission scheme-cooperative transmission mode. A terminal performs cooperative transmission from/to a first base station using a first antenna and a first frequency (f1) and performs cooperative transmission from/to a third base station using a second antenna and a second frequency (f2) by determining a cooperative transmission mode-transmission-targeting communication device set as the first base station 3320, and changing a cooperative transmission communication device set from the first base station 3320 and the second base station 3330 to the first base station 3360 and the third base station 3380.

In this way, a terminal changes a cooperative transmission mode and a cooperative transmission communication device set, and determines a cooperative transmission mode-transmission-targeting communication device set. By doing this, the terminal changes a cooperative transmission mode to the resting cooperative transmission mode except for a cooperative transmission mode which the terminal currently uses and cooperatively transmits from/to at least two cooperative transmission communication devices in order to delete a cooperative transmission communication device included in a cooperative transmission communication device set or add a new cooperative transmission communication device. This scheme is applicable to a case that the terminal changes a cooperative transmission mode where the terminal performs cooperative transmission from/to base stations with different RATs.

In this way, a terminal changes a cooperative transmission mode, and determines a cooperative transmission mode-transmission-targeting communication device set. The terminal additionally changes at least one of a cooperative transmission communication device set, an antenna set for each cooperative transmission communication device, a common use type of each of antenna sets for each cooperative transmission communication device, and an antenna combining method of each of antenna sets for each cooperative transmission communication device. By doing this, the terminal performs cooperative transmission from/to at least two cooperative transmission communication devices. This scheme is applicable to a case that the terminal changes a cooperative transmission mode where the terminal performs cooperative transmission from/to base stations with different RATs.

3. embodiment #3: a case that a cooperative transmission mode, an antennas set, and a common use type of an antenna set are changed.

Figure 34:
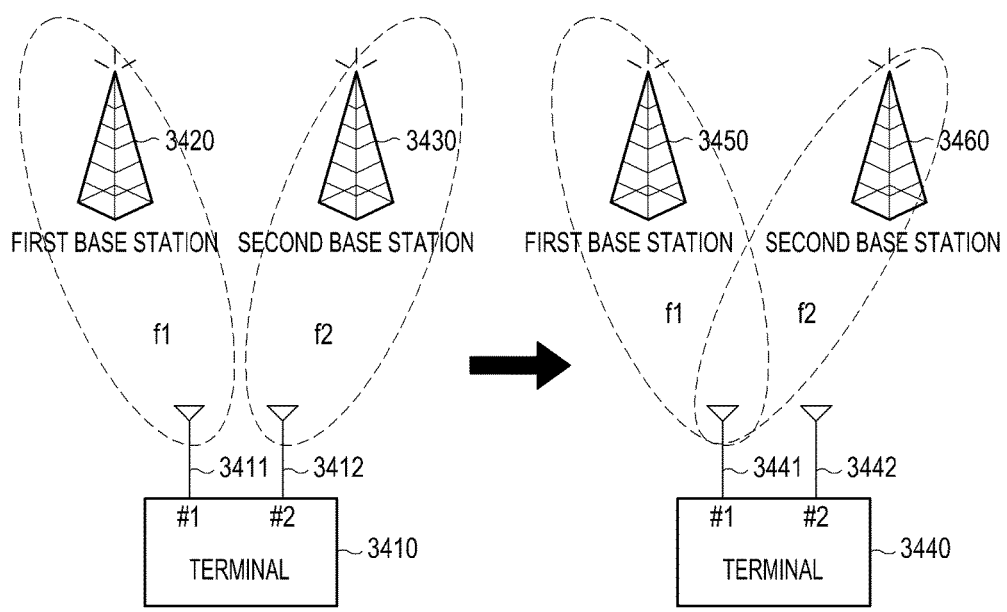
FIG. 34 illustrates an example of changing a cooperative transmission mode, an antennas set, and a common use type of an antenna set according to an embodiment of the present invention.

FIG. 34 illustrates an example of changing a cooperative transmission mode, an antennas set, and a common use type of an antenna set according to an embodiment of the present invention.

As illustrated in FIG. 34, a cooperative transmission method is changed from a first terminal 3410 which performs cooperative transmission from/to a first base station 3420 and a second base station 3430 using two antennas to a second terminal 3440 which performs cooperative transmission from/to a third base station 3450 and a fourth base station 3460. The first terminal 3410 is identical to the second terminal 3440. Further, the first base station 3420 is identical to the third base station 3450, and the second base station 3430 is identical to the fourth base station 3460.

Upon changing such cooperative transmission, a terminal 3440 use commonly an antenna set consisting of a first antenna 3441 and a second antenna 3442, cooperatively transmits from/to a first base station using a first frequency (f1), and cooperatively transmits from/to a second base station 3460 using a second frequency (f2) by changing a cooperative transmission mode from a same information-multi-session-different resource-different transmission scheme cooperative transmission mode to the resting cooperative transmission mode except for the same information-multi-session-different resource-different transmission scheme cooperative transmission mode, determining a cooperative transmission mode-transmission-targeting communication device set as a first base station 3420, and cooperatively transmitting from/to the third base station 3450 and the fourth base station 3460 by using commonly all of the first antenna 3411 and the second antenna 3412.

An antenna set consisting of at least two antennas may operate using an antenna combining method of one of an omnidirectional combining, a directional combining, a diversity combining, a multiplexing combining, a diversity-multiplexing hybrid combining, a CDD combining, and a multi-user combining. Here, the antenna set may operate as various antenna sets according to a directional beam pattern and a signal transmission/reception method for each antenna set.

In this way, a terminal performs cooperative transmission from/to at least two cooperative transmission communication devices by changing a cooperative transmission mode, an antenna set for each cooperative transmission communication device, and a common use type of each of antenna sets for each cooperative transmission communication device, and determining a cooperative transmission mode-transmission-targeting communication device set. This scheme is applicable to a case that the terminal changes a cooperative transmission mode where the terminal performs cooperative transmission from/to base stations with different RATs.

In this way, a terminal changes a cooperative transmission mode, and determines a cooperative transmission mode-transmission-targeting communication device set. The terminal additionally changes at least one of a cooperative transmission communication device set, an antenna set for each cooperative transmission communication device, a common use type of each of antenna sets for each cooperative transmission communication device, and an antenna combining method of each of antenna sets for each cooperative transmission communication device. By doing this, the terminal performs cooperative transmission from/to at least two cooperative transmission communication devices. This scheme is applicable to a case that the terminal changes a cooperative transmission mode where the terminal performs cooperative transmission from/to base stations with different RATs.

4. embodiment #4: a case that a cooperative transmission mode and an antenna combining method of each of antenna sets are changed.

Figure 35:
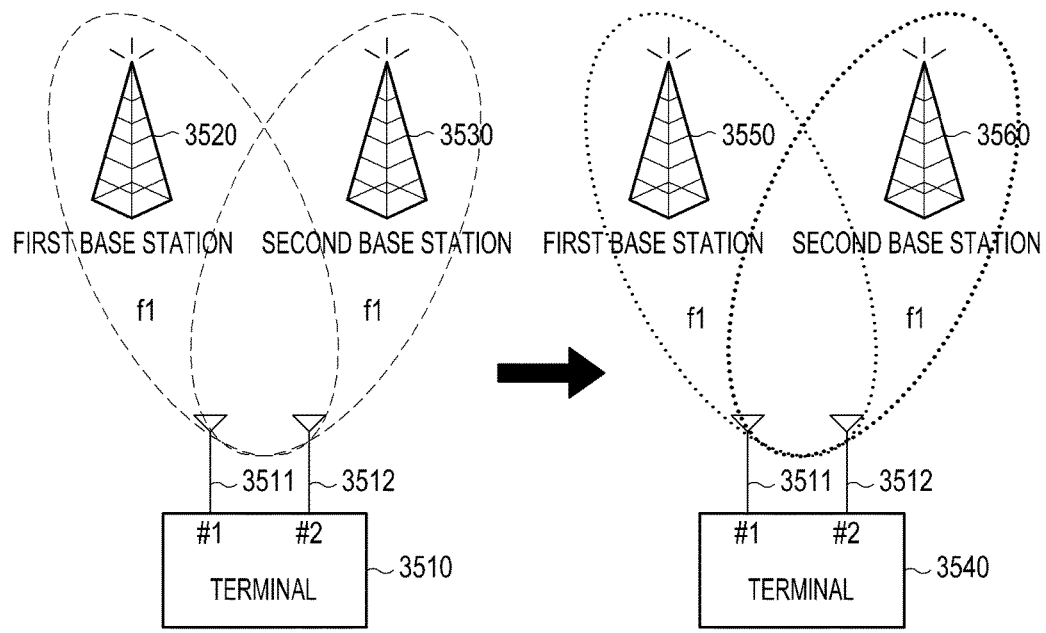
FIG. 35 illustrates an example of changing a cooperative transmission mode and an antenna combining method of each of antenna sets according to an embodiment of the present invention.

FIG. 35 illustrates an example of changing a cooperative transmission mode and an antenna combining method of each of antenna sets according to an embodiment of the present invention.

As illustrated in FIG. 35, a cooperative transmission method is changed from a first terminal 3510 which performs cooperative transmission from/to a first base station 3520 and a second base station 3530 using two antennas to a second terminal 3540 which performs cooperative transmission from/to a third base station 3550 and a fourth base station 3560. The first terminal 3510 is identical to the second terminal 3540. Further, the first base station 3520 is identical to the third base station 3550, and the second base station 3530 is identical to the fourth base station 3560.

Upon changing a cooperative transmission method, a terminal changes a cooperative transmission mode from a same information-single session-same resource-same transmission scheme cooperative transmission mode to other cooperative transmission mode except for the same information-single session-same resource-same transmission scheme cooperative transmission mode. The terminal performs cooperative transmission from/to a first base station and a second base station using a multiplexing combining method through a first antenna and a second antenna by determining a cooperative transmission mode-transmission-targeting communication device set as the first base station and changing a combining method of two antennas from a diversity combining method to a multiplexing combining method.

If an antenna combing method of each antenna set consisting of at least two antennas which are combined using one of an omnidirectional combining, a directional combining, a diversity combining, a multiplexing combining, a diversity-multiplexing hybrid combining, a CDD combining, and a multi-user combining is changed, the antenna combining method may be changed to one of the diversity combining, the multiplexing combining, the diversity-multiplexing hybrid combining, the CDD combining, and the multi-user combining. Here, the antenna combining method may be changed to various antenna combinations according to a change of at least one of a directional beam patter for each antenna set and a signal transmission/reception method.

In this way, a terminal performs cooperative transmission from/to at least two cooperative transmission communication devices by changing a cooperative transmission mode, and an antenna combining method of each of antenna sets for each cooperative transmission communication device, and determining a cooperative transmission mode-transmission-targeting communication device set. This scheme is applicable to a case that the terminal changes a cooperative transmission mode where the terminal performs cooperative transmission from/to base stations with different RATs.

In this way, a terminal changes a cooperative transmission mode, determines a cooperative transmission mode-transmission-targeting communication device set, and additionally changes at least one of a cooperative transmission communication device set, an antenna set for each cooperative transmission communication device, a common use type of each of antenna sets for each cooperative transmission communication device, and an antenna combining method of each of antenna sets for each cooperative transmission communication device. By doing this, the terminal performs cooperative transmission from/to at least two cooperative transmission communication devices. This scheme is applicable to a case that the terminal changes a cooperative transmission mode where the terminal performs cooperative transmission from/to base stations with different RATs.

5. embodiment #5: case that a cooperative transmission mode, a cooperative transmission communication device set, and an antenna set for each cooperative transmission communication device are changed.

Figure 36:
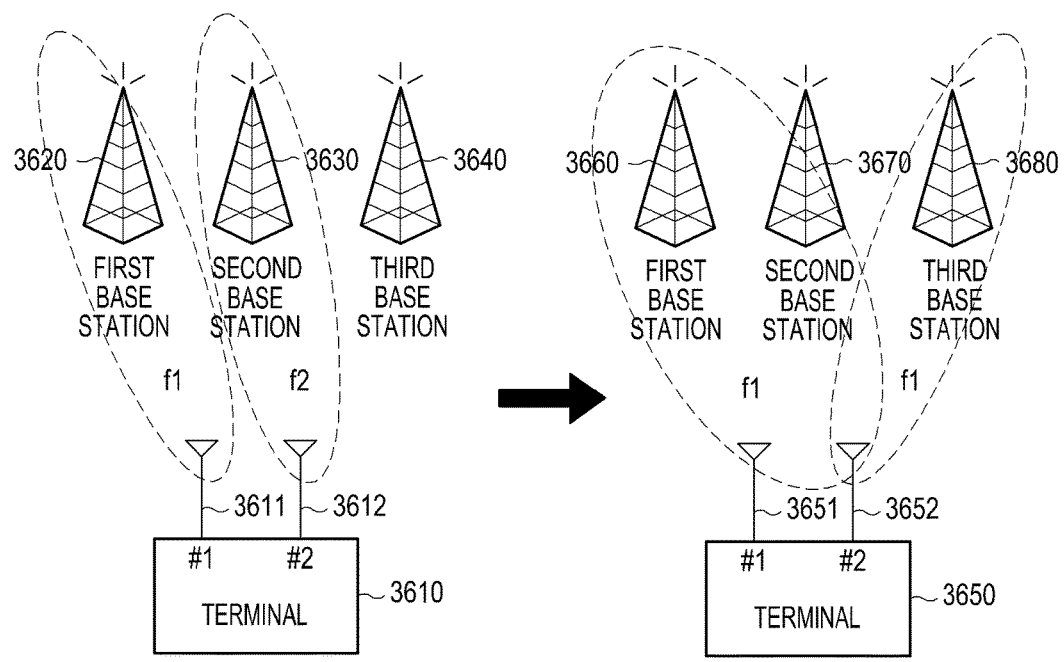
FIG. 36 illustrates an example of changing a cooperative transmission mode and a cooperative transmission communication device set according to an embodiment of the present invention.

FIG. 36 illustrates an example of changing a cooperative transmission mode and a cooperative transmission communication device set according to an embodiment of the present invention.

As illustrated in FIG. 36, a cooperative transmission method is changed from a first terminal 3610 which performs cooperative transmission from/to a first base station 3620 and a second base station 3630 using two antennas to a second terminal 3650 which performs cooperative transmission from/to a fourth base station 3660 and a sixth base station 3680. The first terminal 3610 is identical to the second terminal 3650. Further, the first base station 3620 is identical to the fourth base station 3660, the second base station 3630 is identical to the fifth base station 3670, and the third base station 3640 is identical to the sixth base station 3680. Like this, a state of the first terminal 3610 is changed to a state of the second terminal 3650.

In this cooperative transmission change, a cooperative transmission mode is changed from a same information-multi session-same resource-same transmission scheme-cooperative transmission mode to other cooperative transmission modes except for the same information-multi session-same resource-same transmission scheme-cooperative transmission mode. A terminal uses commonly an antenna set consisting of a first antenna and a second antenna and performs cooperative transmission from/to a first base station and a third base station through a first frequency (f1) by determining a cooperative transmission mode-transmission-targeting communication device set as a first base station 3620, changing a cooperative transmission communication device set from a first base station 3620 and a second base station 3630 to a fourth base station 3660 and a sixth base station 3680, changing an antenna set of a first base station to a first antenna 3651 and a second antenna 3652, and changing an antenna set of a third base station to the second antenna 3652.

An antenna set consisting of at least two antennas may operate using an antenna combining method of one antenna combining method of an omnidirectional combining, a directional combining, a diversity combining, a multiplex combining, a diversity-multiplexing hybrid combining, a CDD combining, and a multi-user combining. Here, the antenna set may operate as various antenna sets according to a directional beam pattern and a signal transmission/reception method for each antenna set.

In this way, a terminal changes a cooperative transmission mode, determines a cooperative transmission mode-transmission-targeting communication device set, and additionally changes at least one of a cooperative transmission communication device set, an antenna set for each cooperative transmission communication device, a common use type of each of antenna sets for each cooperative transmission communication device, and an antenna combining method of each of antenna sets for each cooperative transmission communication device. By doing this, the terminal performs cooperative transmission from/to at least two cooperative transmission communication devices. This scheme is applicable to a case that the terminal changes cooperative transmission from/to base stations with different RATs.

6. embodiment #6: a case that a cooperative transmission mode, a cooperative transmission communication device set, an antenna set for each cooperative transmission communication device, and a common use type of an antenna set for each cooperative transmission communication device are changed.

Figure 37:
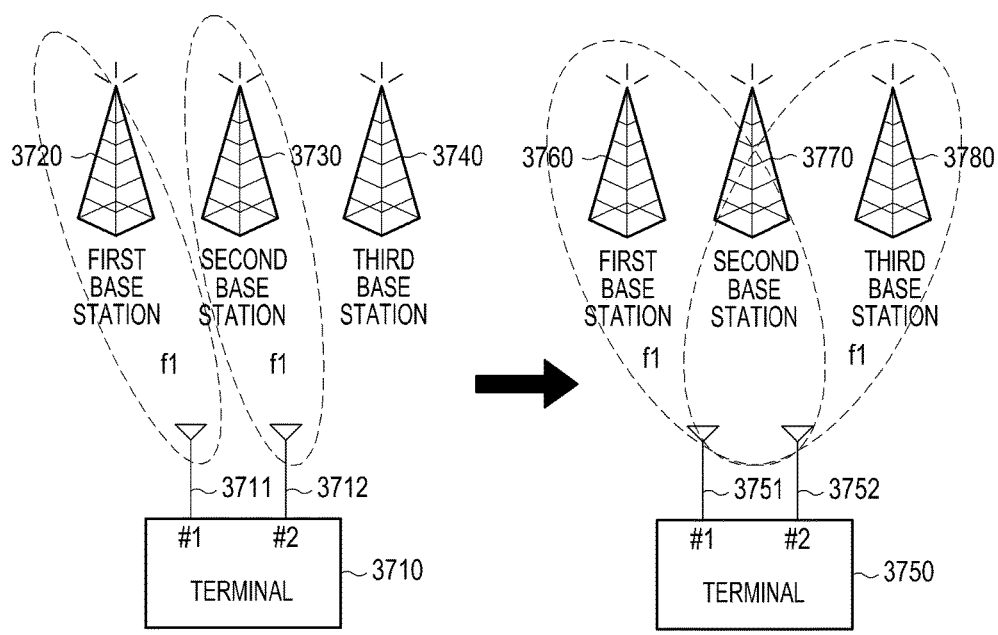
FIG. 37 illustrates an example of changing a cooperative transmission mode, a cooperative transmission communication device set, an antenna set for each cooperative transmission communication device, and a common use type of an antenna set for each cooperative transmission communication device according to an embodiment of the present invention.

FIG. 37 illustrates an example of changing a cooperative transmission mode, a cooperative transmission communication device set, an antenna set for each cooperative transmission communication device, and a common use type of an antenna set for each cooperative transmission communication device according to an embodiment of the present invention.

As illustrated in FIG. 37, a cooperative transmission method is changed from a first terminal 3710 which performs cooperative transmission from/to a first base station 3720 and a second base station 3730 using two antennas to a second terminal 3750 which performs cooperative transmission from/to a fourth base station 3760 and a sixth base station 3780. The first terminal 3710 is identical to the second terminal 3750. Further, the first base station 3720 is identical to the fourth base station 3760, the second base station 3730 is identical to the fifth base station 3770, and the third base station 3740 is identical to the sixth base station 3780. Like this, a state of the first terminal 3710 is changed to a state of the second terminal 3750.

In this cooperative transmission change, a cooperative transmission mode is changed from a same information-multi-session-same resource-same transmission scheme-cooperative transmission mode to other cooperative transmission modes except for the same information-multi-session-same resource-same transmission scheme-cooperative transmission mode. A cooperative transmission mode-transmission-targeting communication device set is determined as a first base station, and a cooperative transmission communication device set is changed from a first base station 3720 and a second base station 3730 to a fourth base station 3760 and a sixth base station 3780. A terminal uses commonly an antenna set consisting of a first antenna and a second antenna and performs cooperative transmission from/to a first base station and a third base station through a first frequency (f1) by changing an antenna set of the first base station from a first antenna 3711 to a first antenna 3751 and a second antenna 3752 and changing an antenna set of the third base station to a first antenna 3751 and a second antenna 3752.

An antenna set consisting of at least two antennas may be operated as at least one antenna combining method among an omnidirectional combining, a directional combining, a diversity combining, a multiplexing combining, a diversity-multiplexing hybrid combining, a CDD combining, and a multi user combining. In this case, the antenna set consisting of at least two antennas may be operated as various antenna combinations according to a directional beam pattern and a signal transmission/reception method for each antenna set.

In this way, a terminal changes a cooperative transmission mode, determines a cooperative transmission mode-transmission-targeting communication device set, and additionally changes at least one of a cooperative transmission communication device set, an antenna set for each cooperative transmission communication device set, a common use type of each of antenna sets for each cooperative transmission communication device, and an antenna combining method of each of antenna sets for each cooperative transmission communication device. By doing this, a terminal performs cooperative transmission from/to at least two cooperative transmission communication devices. This scheme is applicable to a case that the terminal changes a cooperative transmission mode where the terminal performs cooperative transmission from/to base stations with different RATs.

An embodiment of the present invention may be implemented with a record medium including instructions which are implemented by a computer such as a program mode which is implemented by a computer. A computer readable medium may be an arbitrary available medium which may be accessed by a computer, and includes volatile and non-volatile media, and removable and non-removable media. The computer readable medium may include a computer storage medium and a communication medium. The computer storage medium includes volatile and non-volatile media, and removable and non-removable media which are implemented with a computer readable instruction, a data structure, a program module, or an arbitrary method or technology for storing information such as other data. The communication medium typically includes a computer readable instruction, a data structure, a program module, or other data of a modulated data signal such as a carrier, or other transmission mechanism, and an arbitrary information transfer medium.

The detailed description of the present invention is just an example, it will be understood by those skilled in the art that various changes in form and details may be made therein without departing from the spirit and essential features of the present invention. So, it will be noted that the described embodiments are just for examples, and do not limit the present invention. For example, each configuration element which is described as a single format may be implemented with distributed formats, and configuration elements which are described with distributed formats may be implemented with a combined format.

Scope of the present invention is defined the appended claims rather than the detailed description. It should be interpreted that meaning and scope of the appended claims and all changes and modifications which are derived from equivalents of the appended claims are included in the scope of the present invention.

While the present invention has been shown and described with reference to various embodiments thereof, it will be understood by those skilled in the art that various changes in form and details may be made therein without departing from the spirit and scope of the present invention as defined by the appended claims and their equivalents.

The invention claimed is:

1. A terminal for controlling cooperative transmission from at least two cooperative transmission communication devices or to the at least two cooperative transmission communication devices, the terminal comprising:
   a cooperative transmission communication device set determination unit configured to determine the at least two cooperative transmission communication devices for the cooperative transmission to the terminal or from the terminal, or to change the at least two cooperative transmission communication devices;
   a transmission mode determination unit configured to determine or change a cooperative transmission mode; and
   a mode-transmission-targeting communication device set determination unit configured to determine at least one mode-transmission-targeting communication device among the determined or changed cooperative transmission communication devices for transmitting determined or changed cooperative transmission mode information to the determined at least one mode-transmission-targeting communication device,
   wherein the determined at least one mode-transmission-targeting communication device controls the at least two cooperative transmission communication devices to cooperatively transmit with the terminal using the determined or changed cooperative transmission mode,
   wherein the cooperative transmission mode is one of a same information transmission mode, a different information transmission mode, a hybrid information transmission mode, and a partial set cooperative transmission mode,
   wherein the terminal directly determines the at least two cooperative transmission communication devices, and
   wherein the terminal directly determines and changes the cooperative transmission mode.

2. The terminal of claim 1, wherein the cooperative transmission communication device set determination unit determines Radio Access Technologies (RATs) of a part or all of the determined at least two cooperative transmission communication devices to be identical or different one another, or
   wherein the cooperative transmission communication device set determination unit changes the RATs of the part or all of the changed at least two cooperative transmission communication devices to be identical or different from one another.

3. The terminal of claim 1, further comprising:
   an antenna set determination unit configured to determine at least one antenna among a plurality of terminal-mounted antennas for each of the at least two cooperative transmission communication devices for connecting to at least one of the at least two cooperative transmission communication devices.

4. The terminal of claim 1, further comprising:
an antenna set common use type determination unit configured to determine if each of the at least two cooperative transmission communication devices for cooperative transmission to the terminal or from the terminal commonly use a part or all of antennas forming each of antenna sets for each of the at least two cooperative transmission communication devices, or exclusively use the part or all of the antennas forming each of the antenna sets for each of the at least two cooperative transmission communication devices, or
the antenna set common use type determination unit configured to change each of the at least two cooperative transmission communication devices for cooperative transmission to the terminal or from the terminal commonly use the part or all of the antennas forming each of the antenna sets for each of the at least two cooperative transmission communication devices, or exclusively use the part or all of the antennas forming each of the antenna sets for each of the at least two cooperative transmission communication devices.

5. The terminal of claim 1, further comprising:
an antenna combining method determination unit configured to combine at least two antennas forming an antenna set for each of the at least two cooperative transmission communication devices.

6. The terminal of claim 5, wherein the antenna combining method determination unit determines one of an omni-directional combining, a directional combining, a diversity combining, a multiplexing combining, a diversity-multiplexing hybrid combining, a CDD combining, and a multiuser combining of the antenna set.

7. The terminal of claim 5, wherein the antenna combining method determination unit determines at least one of a beam pattern for the antenna set and a signal transmission or reception method for the antenna set, or
the antenna combining method determination unit changes the at least one of the beam pattern for the antenna set and the signal transmission or reception method for the antenna set.

8. The terminal of claim 1, wherein the transmission mode determination unit determines the cooperative transmission mode by considering at least one of: a channel condition between the terminal and the at least two cooperative transmission communication devices, a connection state, a Radio Access Technology (RAT) preference, a service price, an neighbor list order, a required bandwidth condition, a required transmission rate condition, a required error rate condition, an access condition, distances from the at least two cooperative transmission communication devices, and loading rates of the at least two cooperative transmission communication devices, and
wherein the mode-transmission-targeting communication device set determination unit determines the at least one mode-transmission-targeting communication device to which the terminal will transmit the determined cooperative transmission mode information by considering at least one of: the channel condition between the terminal and the at least two cooperative transmission communication devices, the connection state, the RAT preference, the service price, the neighbor list order, the required bandwidth condition, the required transmission rate condition, the required error rate condition, the access condition, the distances from the at least two cooperative transmission communication devices, and the loading rates of the at least two cooperative transmission communication devices.

9. The terminal of claim 1, wherein the mode-transmission-targeting communication device set determination unit determines the at least one mode-transmission-targeting communication device included in the at least two cooperative transmission communication devices to which the terminal currently connects, determines the at least one mode-transmission-targeting communication device included in the at least two cooperative transmission communication devices to which the terminal will newly connect, or determines the at least one mode-transmission-targeting communication device which is not included in the cooperative transmission communication device set to which the terminal currently connects and the cooperative transmission communication device set to which the terminal will newly connect.

10. A terminal for controlling cooperative transmission from at least two cooperative transmission communication devices or to the at least two cooperative transmission communication devices, the terminal comprising:
a cooperative transmission communication device set determination unit configured to determine the at least two cooperative transmission communication devices for the cooperative transmission to the terminal or from the terminal, or to change the at least two cooperative transmission communication devices;
a transmission mode determination unit configured to determine or change a cooperative transmission mode; and
a mode-transmission-targeting communication device set determination unit configured to determine at least one mode-transmission-targeting communication device among the determined or changed cooperative transmission communication devices for transmitting determined or changed cooperative transmission mode information to the determined at least one mode-transmission-targeting communication device,
wherein the determined at least one mode-transmission-targeting communication device controls the at least two cooperative transmission communication devices to cooperatively transmit with the terminal using the determined or changed cooperative transmission mode,
wherein the cooperative transmission mode is one of a same information transmission mode, a different information transmission mode, a hybrid information transmission mode, and a partial set cooperative transmission mode,
wherein the same information transmission mode is a mode where the terminal cooperatively transmits same information to at least two cooperative transmission communication devices, or the at least two cooperative transmission communication devices cooperatively transmit same information to the terminal,
wherein the different information transmission mode is a mode where the terminal cooperatively transmits different information to at least two cooperative transmission communication devices, or the at least two cooperative transmission communication devices cooperatively transmit different information to the terminal,
wherein the hybrid information transmission mode is a mode where the terminal cooperatively transmits hybrid information through each cooperative transmission path to at least two cooperative transmission communication devices, or the at least two cooperative transmission communication devices cooperatively transmit hybrid information through each cooperative transmission path to the terminal, wherein hybrid information is combined so that one part of a plurality of cooperative transmission paths carries identical information and another part of the plurality of cooperative transmission paths carries different information, and wherein the partial set cooperative transmission mode is a mode where the terminal does not transmit a signal to a part of the at least two cooperative transmission communication devices or receives the signal from the part of the at least two cooperative transmission communication devices, and cooperatively transmits to remaining cooperative transmission communication devices or receives from the remaining cooperative transmission communication devices, wherein the terminal directly determines the at least two cooperative transmission communication devices, and wherein the terminal directly determines and changes the cooperative transmission mode.

11. The terminal of claim 10, wherein the same information transmission mode includes one of:
a first mode where the terminal cooperatively transmits same information to the at least two cooperative transmission communication devices through a single session configured by combining same information in PHYsical (PHY) layer;
a second mode where the terminal cooperatively transmits same information to the at least two cooperative transmission communication devices through multiple sessions configured by independently processing same information in PHY layer and by combining same information in upper layer including MAC layer;
a third mode where the terminal cooperatively transmits same information to the at least two cooperative transmission communication devices using the same resource or different resources; and
a fourth mode where the terminal cooperatively transmits same information to the at least two cooperative transmission communication devices using a same transmission scheme or different transmission schemes, wherein the different information transmission mode includes one of:
a fifth mode where the terminal cooperatively transmits different information to the at least two cooperative transmission communication devices through a single session configured by combining different information in PHY layer;
a sixth mode where the terminal cooperatively transmits different information to the at least two cooperative transmission communication devices through multiple sessions configured by independently processing different information in PHY layer and by combining different information in upper layer including MAC layer;
a seventh mode where the terminal cooperatively transmits different information to the at least two cooperative transmission communication devices using the same resource or different resources; and
an eighth mode where the terminal cooperatively transmits different information to the at least two cooperative transmission communication devices using the same transmission scheme or different transmission schemes, wherein the hybrid information transmission mode includes one of:
a ninth mode where the terminal transmits identical information through the part of the cooperative transmission paths using a same information transmission mode; and
a tenth mode where the terminal transmits different information through the another part of the cooperative transmission paths using a different information transmission mode, wherein the partial set cooperative transmission mode is a mode where the terminal cooperatively transmits to the remaining cooperative transmission communication devices using one of a same information transmission mode, a different information transmission mode, and a hybrid information transmission mode or receives from the remaining cooperative transmission communication devices using one of the same information transmission mode, the different information transmission mode, and the hybrid information transmission mode, or wherein the partial set cooperative transmission mode is a mode where the terminal cooperatively transmits one of the same information, the different information, and the hybrid information for each cooperative transmission path to the at least two cooperative transmission communication devices or receives one of the same information, the different information, and the hybrid information for each cooperative transmission path from the at least two cooperative transmission communication devices.

12. A method for controlling a cooperative transmission from at least two cooperative transmission communication devices in a terminal or to the at least two cooperative transmission communication devices in the terminal, comprising:
a cooperative transmission device set determining step for determining the at least two cooperative transmission communication devices for the cooperative transmission to the terminal or from the terminal or a cooperative transmission device set changing step for changing the at least two cooperative transmission communication devices for the cooperative transmission to the terminal or from the terminal;
a cooperative transmission mode determining step that determines a cooperative transmission mode or a cooperative transmission mode changing step for changing the cooperative transmission mode; and
a mode-transmission-targeting communication device determining step that determines at least one mode-transmission-targeting communication device among the determined or changed cooperative transmission communication devices for transmitting determined or changed cooperative transmission mode information to the determined at least one mode-transmission-targeting communication device, wherein the determined at least one mode-transmission-targeting communication device controls the at least two cooperative transmission communication devices to cooperatively transmit with the terminal using the determined or changed cooperative transmission mode, wherein the cooperative transmission mode is one of a same information transmission mode, a different information transmission mode, a hybrid information transmission mode, and a partial set cooperative transmission mode, wherein the terminal directly determines the at least two cooperative transmission communication devices, and wherein the terminal directly determines and changes the cooperative transmission mode.

13. The method of claim 12, further comprising at least one of:

- an antenna set determining step for determining at least one antenna among a plurality of terminal-mounted antennas for each cooperative transmission communication device for connecting to at least one cooperative transmission communication device,
- an antenna set changing step for changing at least one antenna among the plurality of terminal-mounted antennas for each cooperative transmission communication device for connecting to the at least one cooperative transmission communication device,
- an antenna set common use type determining step for determining if respective cooperative transmission communication devices for cooperative transmission to the terminal or from the terminal commonly use a part or all of antennas forming each of antenna sets for each cooperative transmission communication device, or exclusively use the part or all of the antennas forming each of the antenna sets for each cooperative transmission communication device,
- an antenna set common use type changing step for changing if the respective cooperative transmission communication devices for cooperative transmission to the terminal or from the terminal commonly use the part or all of the antennas forming each of the antenna sets for each cooperative transmission communication device, or exclusively use the part or all of the antennas forming each of the antenna sets for each cooperative transmission communication device,
- an antenna combining method determining step for determining an antenna combining method for combining at least two antennas forming an antenna set for each of the antenna sets for each cooperative transmission communication device, and
- an antenna combining method changing step for changing an antenna combining method for combining the at least two antennas forming the antenna set for each of the antenna sets for each cooperative transmission communication device.

* * * * *